US012025286B2

(12) United States Patent
Kim et al.

(10) Patent No.: US 12,025,286 B2
(45) Date of Patent: Jul. 2, 2024

(54) LAMP FOR VEHICLE

(71) Applicant: SL Corporation, Daegu (KR)

(72) Inventors: Jun Tae Kim, Gyeongsan-si (KR); Ki Beom Park, Gyeongsan-si (KR); Seong Won Choi, Gyeongsan-si (KR); Yong Suk Park, Gyeongsan-si (KR); Seok Hyun Lee, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/304,453

(22) Filed: Apr. 21, 2023

(65) Prior Publication Data

US 2023/0341101 A1 Oct. 26, 2023

(30) Foreign Application Priority Data

Apr. 22, 2022 (KR) ........................ 10-2022-0050018
Apr. 22, 2022 (KR) ........................ 10-2022-0050027

(51) Int. Cl.

| | |
|---|---|
| ***F21S 41/26*** | (2018.01) |
| ***F21S 41/148*** | (2018.01) |
| ***F21S 41/20*** | (2018.01) |
| ***F21S 41/265*** | (2018.01) |
| ***F21S 41/32*** | (2018.01) |
| ***F21S 41/36*** | (2018.01) |
| ***F21S 41/43*** | (2018.01) |
| ***F21W 102/13*** | (2018.01) |
| ***F21W 102/155*** | (2018.01) |
| ***F21W 107/10*** | (2018.01) |
| ***F21Y 115/10*** | (2016.01) |

(52) U.S. Cl.

CPC ............. *F21S 41/26* (2018.01); *F21S 41/148* (2018.01); *F21S 41/265* (2018.01); *F21S 41/285* (2018.01); *F21S 41/321* (2018.01); *F21S 41/36* (2018.01); *F21S 41/43* (2018.01); *F21W 2102/13* (2018.01); *F21W 2102/155* (2018.01); *F21W 2107/10* (2018.01); *F21Y 2115/10* (2016.08)

(58) Field of Classification Search

CPC ......... F21S 41/26; F21S 41/265; F21S 41/285
See application file for complete search history.

(56) References Cited

U.S. PATENT DOCUMENTS

2015/0138822 A1* 5/2015 Tatsukawa ............ F21S 41/148 362/516
2016/0230948 A1* 8/2016 Kratochvil .............. F21S 41/43
2018/0128442 A1* 5/2018 Suwa ................... B60Q 1/1423

FOREIGN PATENT DOCUMENTS

KR 20210034243 A * 3/2021 .............. F21S 41/25

OTHER PUBLICATIONS

Machine translation of Mun, KR 20210034243 A, published Mar. 30, 2021 (Year: 2021).*

* cited by examiner

*Primary Examiner* — William N Harris
(74) *Attorney, Agent, or Firm* — United One Law Group LLC; Kongsik Kim; Jhongwoo Peck

(57) ABSTRACT

A lamp for a vehicle includes a first beam pattern formation part configured to emit first light for a first beam pattern and a lens configured to form the first beam pattern by transmitting the first light. The first beam pattern formation part includes a first light source that emits the first light; and a shield configured to block a portion of the first light that is emitted from the first light source toward the lens. The lens includes a spread lens that concentrates incident light to a focal line having a linear shape and a spot lens that concentrates incident light to a point.

17 Claims, 23 Drawing Sheets

LAMP FOR VEHICLE

CROSS-REFERENCE TO RELATED APPLICATIONS

This application claims priority from Korean Patent Application Nos. 10-2022-0050018, filed on Apr. 22, 2022, and 10-2022-0050027, filed on Apr. 22, 2022, which are incorporated herein by reference in their entireties.

RELATED ART

The present disclosure relates to a lamp for a vehicle, and more particularly, to a lamp for a vehicle capable of more clearly implementing a concentrated light area and a diffused light area of a low beam pattern using a single lens.

Vehicles are equipped with various types of lamps that have an illumination function for easily identifying objects disposed around the vehicle during low-light conditions (e.g., night-time driving) and a signaling function for informing driving states of the vehicle to other vehicles or road users.

For example, the vehicles are mainly provided with head lamps and fog lamps, which are provided for the purpose of illumination functions, and turn signal lamps, tail lamps, brake lamps, side markers, and the like, which are provided for the purpose of signaling functions. These lamps are regulated for their installation standards and specifications so that each function is sufficiently satisfied.

The head lamp forms a low beam pattern or a high beam pattern so that the driver's forward vision is secured when the vehicle is operated in low-light conditions, such as at night, and plays an important role in safe driving.

In some head lamps, a low beam pattern or a high beam pattern is selectively formed using a single lamp module based on the operation of a shield member. In some other head lamps, a low beam pattern and a high beam pattern are formed with separate lamp modules, respectively.

The head lamp may be mainly maintained in the low beam pattern to prevent glare to the driver of the oncoming vehicle or the driver of the preceding vehicle, and when driven at a high speed or driven in low-light conditions, the high beam pattern may be formed as necessary to promote safe driving.

The low beam pattern may include different areas defined by light concentration. A cutoff line may be provided on an area on which light is more concentrated than other areas to prevent causing glare to the driver of the oncoming vehicle and simultaneously provide sufficient forward vision in relatively near-field. If the cutoff line is not clearly formed at the corresponding area, glare may be caused to the driver of the oncoming vehicle, or the driver's forward vision may not be sufficiently secured.

Therefore, there is a need for more clearly implementing each area of the low beam pattern defined by the different degrees of light concentration.

SUMMARY

The present disclosure provides a lamp for a vehicle that can more clearly implement a concentrated light area and a diffused light area of a low beam pattern using a single lens. The objects of the present disclosure are not limited to the aforementioned object, but other objects not described herein will be clearly understood by those skilled in the art from descriptions below.

An embodiment of the present disclosure provides a lamp for a vehicle. The lamp may include a first beam pattern formation part configured to emit first light for a first beam pattern; and a lens configured to form the first beam pattern by transmitting the first light. In particular, the first beam pattern formation part may include a first light source that emits the first light; and a shield configured to block a portion of the first light that is emitted from the first light source toward the lens, and the lens may include a spread lens that concentrates incident light to a focal line having a linear shape; and a spot lens that concentrates incident light to a point.

In an embodiment, the first beam pattern may include a spread pattern; and a spot pattern, which is smaller than the spread pattern and overlaps the spread pattern, and the shield may include a spot shield that blocks a portion of light to form the spot pattern; and a spread shield that blocks a portion of light to form the spread pattern. Further, the light that passes through the spread lens may form the spread pattern, and the light that passes through the spot lens forms the spot pattern. In an embodiment, the spot shield may include a boundary shield that blocks a portion of the light to form an upper boundary line of the spot pattern; and a slope shield that blocks a portion of the light to form the upper boundary line and a slope line of the spot pattern.

In an embodiment, the lamp may include a first vehicle lamp disposed at a left side of the vehicle and a second vehicle lamp disposed at a right side of the vehicle. The first vehicle lamp may include a first slope shield and a first boundary shield, and the second vehicle lamp may include a second slope shield and a second boundary shield. In particular, when the first slope shield is disposed more inward to the vehicle's longitudinal centerline than the first boundary shield, the second slope shield may be disposed more outward from the vehicle's longitudinal centerline than the second boundary shield. On the other hand, when the first slope shield is disposed more outward from the vehicle's longitudinal centerline than the first boundary shield, the second slope shield may be disposed more inward to the vehicle's longitudinal centerline than the second boundary shield.

In an embodiment, the spread lens may have an elongated shape in one direction, and the spot lens may be disposed at each of both sides of the spread lens. In an embodiment, the first beam pattern formation part may include a plurality of first reflectors that reflect the first light emitted from the first light source toward the spot lens, and the first light may be reflected to each of the spot lenses respectively disposed at the both sides of the spread lens by at least one first reflector among the plurality of reflectors. In an embodiment, the slope shield may be disposed to correspond to the spot lens, which is disposed at one side among the spot lenses respectively disposed at the both sides of the spread lens.

In an embodiment, a light emission surface of the lens may have a continuous curvature over an entire area or may include at least one section having a discontinuous curvature.

In an embodiment, the lamp may further include a second beam pattern formation part configured to emit second light that forms a second beam pattern different from the first beam pattern. In particular, the second beam pattern formation part may include a second light source that emits the second light. The first beam pattern formation part may include a first reflector that reflects the first light emitted from the first light source, and the second beam pattern formation part may include a second reflector that reflects the second light emitted from the second light source. In an embodiment, each of the first reflector and the second reflector may be provided in plurality, so that the plurality of first reflectors and second reflectors may be disposed side by side along a longitudinal direction of the lens, and the first reflectors and the second reflectors may be alternately disposed.

In an embodiment of the present disclosure, a lamp for a vehicle may include a first beam pattern formation part configured to form a first beam pattern. The first beam pattern formation part may include a light source part that emits light for the first beam pattern; a reflector configured to reflect the light emitted from the light source part; and a lens configured to form the first beam pattern by transmitting the light reflected by the reflector. In particular, when viewed from a front of the vehicle, the lens may provide a first focal line and a second focal line, which are elongated in directions different from each other.

In an embodiment, the first focal line may be elongated in a horizontal direction, and the second focal line may extend from the first focal line in an obliquely upper direction or an obliquely downward direction.

In an embodiment, the first beam pattern formation part may further include a shield configured to block a portion of light emitted from the reflector toward the lens, and the shield may have a shape corresponding to each of the first focal line and the second focal line.

In an embodiment, the first beam pattern may include a spread pattern; and a spot pattern, which is smaller than the spread pattern and overlaps the spread pattern. The light source part may include a plurality of light sources, and the plurality of light sources may include a first light source that forms the spread pattern; and a second light source that forms the spot pattern.

In an embodiment, the reflector may include a plurality of reflection parts corresponding to the plurality of light sources, and the plurality of reflection parts may include a first reflection part that reflects light emitted from the first light source; and a second reflection part that reflects light emitted from the second light source. In particular, the first reflection part may have a posture corresponding to the first focal line, and the second reflection part may have a posture corresponding to the second focal line.

In an embodiment, the second reflection part may be configured to reflect light to pass through the second focal line without passing through the first focal line, or reflect light to pass through the first focal line and the second focal line.

In an embodiment, a cutoff line may be disposed on an upper boundary of the first beam pattern, and the cutoff line may include a boundary line and a slope line, such that light that is reflected by the second reflection part and passes through the second focal line may be used to form the slope line.

In an embodiment, a light emission surface of the lens may have a continuous curvature over an entire area. A light incident surface of the lens may include a first light incident surface that receives light for forming the first focal line; and a second light incident surface that receives light for forming the second focal line. A curvature of the first light incident surface and a curvature of the second light incident surface may be discontinuous at an interface between the first light incident surface and the second light incident surface.

In an embodiment, the lens may include a first lens part that provides the first focal line; and a second lens part that provides the second focal line. The first light incident surface may include a surface through which light is incident on the first lens part, and the second light incident surface may include a surface through which light is incident on the second lens part. In an embodiment, a vertical position of a vertex of the first light incident surface with respect to a bottom of the lens may be uniform regardless of a distance from the second lens part, and a vertical position of a vertex of the second light incident surface with respect to the bottom of the lens may gradually increase or decrease as a distance from the first lens part increases.

In the lamp for the vehicle according to the present disclosure as described herein, the plurality of lens parts having the different refractive powers may be provided in a single lens, and thus, the concentrated light area and the diffused light area of the low beam pattern may be more clearly implemented.

Particularities of other embodiments are included in the detailed description and drawings.

BRIEF DESCRIPTION OF THE FIGURES

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1:
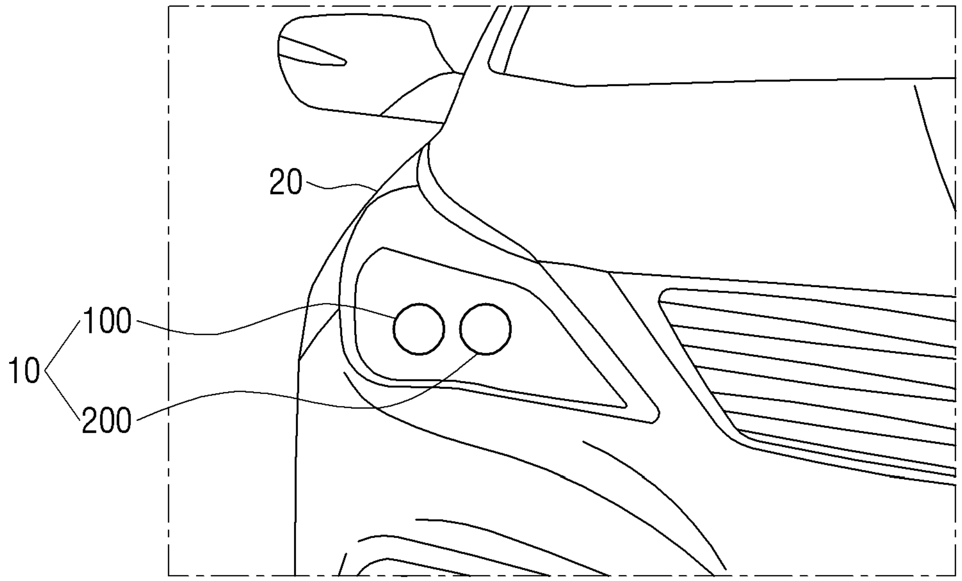
FIG. 1 is a view illustrating a lamp for a vehicle when viewed from a front side of the vehicle according to an embodiment of the present disclosure.

Hereinafter, exemplary embodiments of the present disclosure will be described below in more detail with reference to the accompanying drawings. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Like reference numerals refer to like elements throughout.

Unless terms used in the present disclosure are defined differently, all terms (including technical and scientific terms) used herein have the same meaning as generally understood by those skilled in the art. Also, unless defined clearly and apparently in the description, the terms as defined in a commonly used dictionary are not too ideally or excessively construed as having formal meaning.

Figure 2:
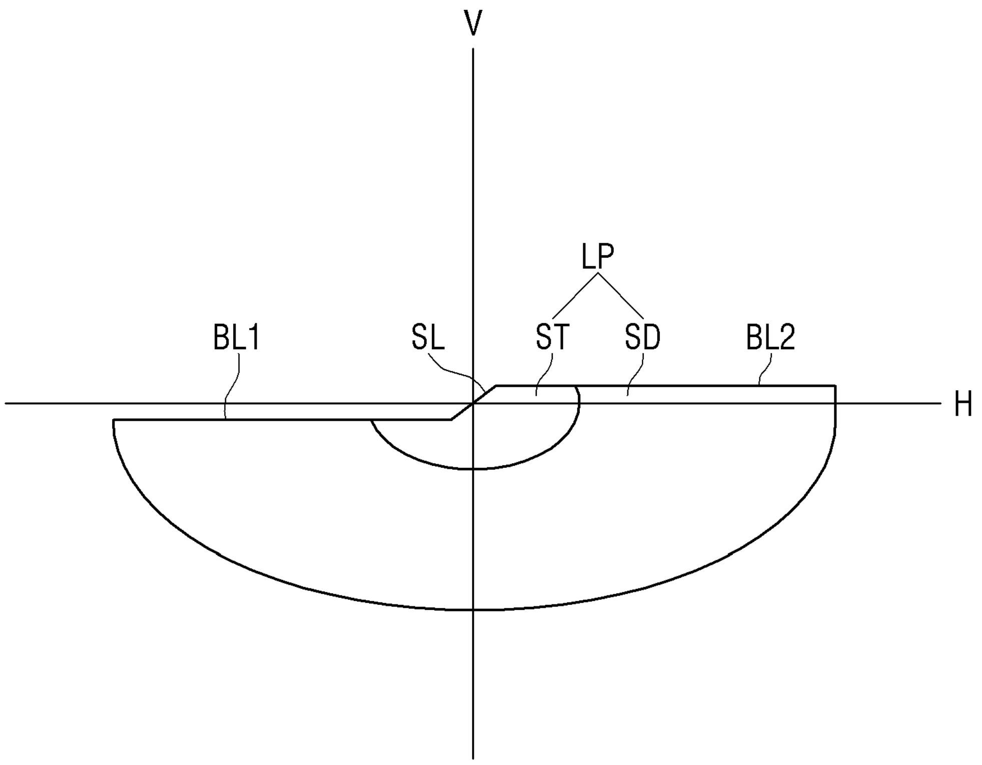
FIG. 2 is an example of a first beam pattern to be formed by the lamp for vehicle according to embodiments of the present disclosure.
Figure 3:
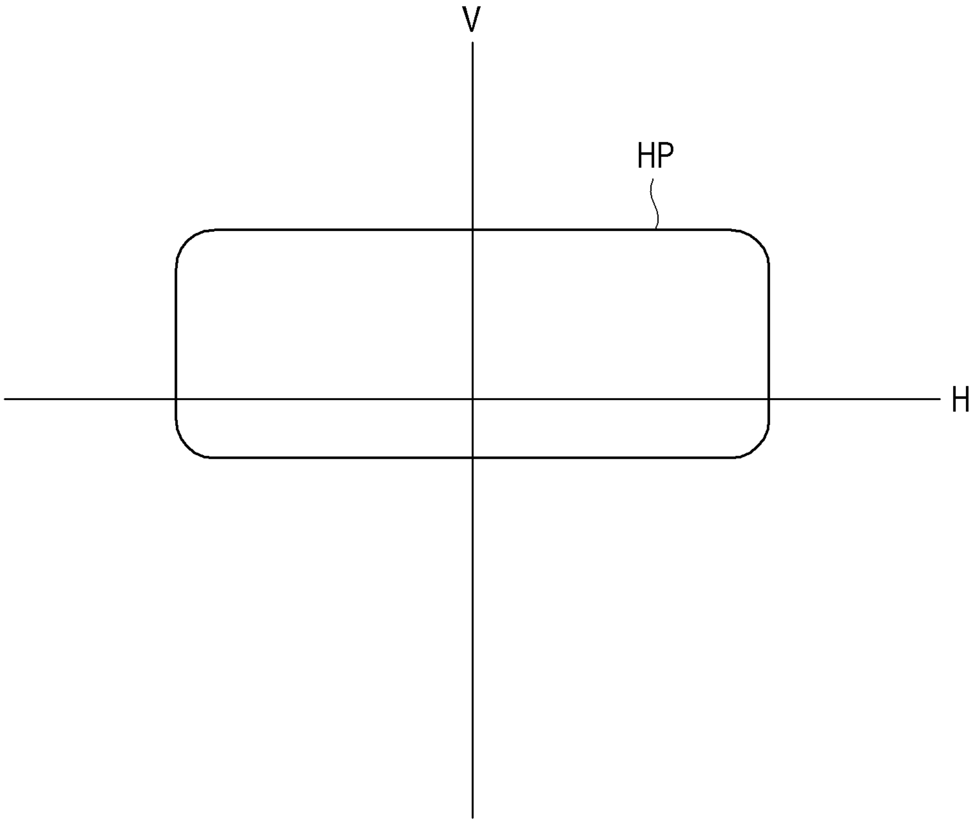
FIG. 3 is an example of a second beam pattern to be formed by the lamp for vehicle according to embodiments of the present disclosure.

FIG. 1 is a view illustrating a lamp for a vehicle viewed from a front side of the vehicle, FIG. 2 is an example of a first beam pattern formed by the lamp for vehicle according to embodiments of the present disclosure, and FIG. 3 an example of a second beam pattern formed by the lamp for vehicle according to embodiments of the present disclosure.

Referring to FIG. 1, a lamp 10 for a vehicle (hereinafter, interchangeably referred to as a vehicle lamp 10) according to an embodiment of the present disclosure may include a first beam pattern formation part 100 and a second beam pattern formation part 200.

In the embodiment of the present disclosure, the vehicle lamp 10 may be installed on each of both front sides of a vehicle 20 to secure a forward view when the vehicle 20 is operated in low-light conditions (e.g., at night or in a dark place such as a tunnel). Thus, a case in which the vehicle lamp 10 is used as a head lamp will be mainly described. However, this is merely an example to help understanding of the present disclosure, and the vehicle lamp 10 according to an embodiment of the present disclosure is not limited to the head lamp, and may be used for various lamps installed in the vehicle 20, such as fog lamps, tail lamps, brake lamps, turn signal lamps, position lamps, and daytime running lamps.

The vehicle lamp 10 may form a first beam pattern LP (see FIG. 2) to secure a relatively near-field view in front of the vehicle and a second beam pattern HP (see FIG. 2) to secure a relatively far-field view in front of the vehicle. The first beam pattern LP may include a low beam pattern, and the second beam pattern HP may include a high beam pattern.

A first beam pattern formation part 100 may radiate light to provide the first beam pattern LP, and a second beam pattern formation part 200 may radiate light to provide the second beam pattern HP different from the first beam pattern LP.

Referring to FIG. 2, the first beam pattern LP may include a spread pattern SD and a spot pattern ST. The spread pattern SD may be provided in a relatively wider size, and the spot pattern ST may be provided in a smaller size than the spread pattern SD. The spot pattern ST may overlap the spread pattern SD. Further, as shown in FIG. 2, the spot pattern ST may be enclosed by the spread pattern SD. An area on which the spot pattern ST overlaps the spread pattern SD may be an area on which more light is concentrated. Hereinafter, this area is referred to as a concentrated light area, and an area defined by only the spread pattern SD outside the concentrated light area is referred to as a diffused light area. Since the concentrated light area is provided by allowing the spread pattern SD and the spot pattern ST to overlap each other, and the diffuse light area is provided by only the spread pattern SD, the concentrated light area may exhibit a brightness higher than a brightness of the diffused light area.

The concentrated light area may be a beam pattern emitted onto the near-field forward area on which the driver's attention is focused, and thus, the near-field forward light of the vehicle 20 may be secured more readily by the concentrated light area.

Cutoff lines BL1, BL2, and SL may be disposed on upper boundaries of the first beam pattern LP. The cutoff lines BL1, BL2, and SL may include boundary lines BL1 and BL2 and a slope line SL. The boundary lines BL1 and BL2 may include a first boundary line BL1 and a second boundary line BL2. The first boundary line BL1 and the second boundary line BL2 may define an upper boundary of the first beam pattern LP. For example, the first boundary line BL1 and the second boundary line BL2 may be disposed to be parallel to the ground.

The slope line SL may be provided in a direction inclined with respect to a longitudinal direction of the first boundary line BL1 and the second boundary line BL2 to connect the first boundary line BL1 and the second boundary line BL2. Thus, the first boundary line BL1 and the second boundary line BL2 may have different heights (e.g., vertical positions). FIG. 2 is a view illustrating a state in which the second boundary line BL2 is provided higher than the first boundary line BL1.

According to some embodiments of the present disclosure, the cutoff line may include only the boundary line and no slope line. In this case, one boundary line may define an upper boundary of the first beam pattern LP. Hereinafter, it will be mainly described that the cutoff lines include all of the boundary lines BL1 and BL2 and the slope line SL.

Referring to FIG. 3, the second beam pattern HP may represent a beam pattern emitted to a longer distance forward area. When the second beam pattern HP is provided by the second beam pattern formation part 200, the far-field forward view of the vehicle 20 may be secured more readily.

Figure 4:
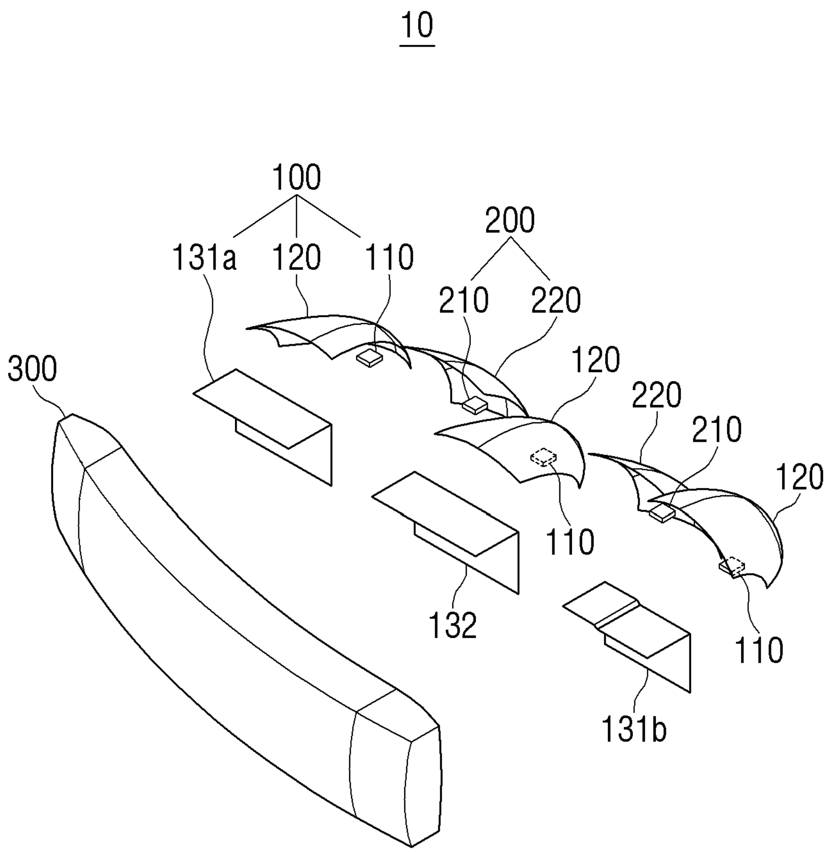
FIG. 4 is a perspective view illustrating a lamp for a vehicle according to an embodiment of the present disclosure.
Figure 5:
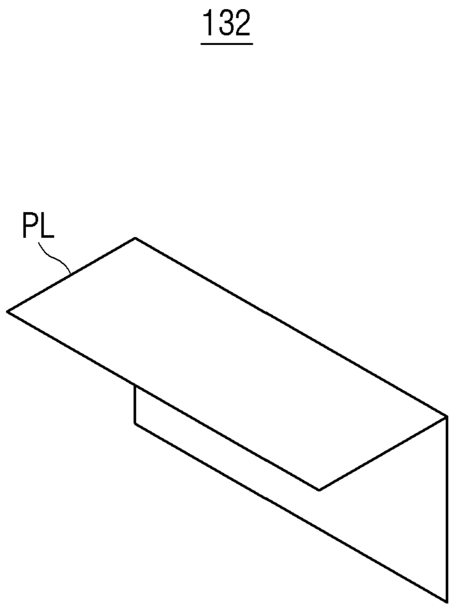
FIG. 5 is a perspective view of a spread shield according to an embodiment of the present disclosure.
Figure 6:
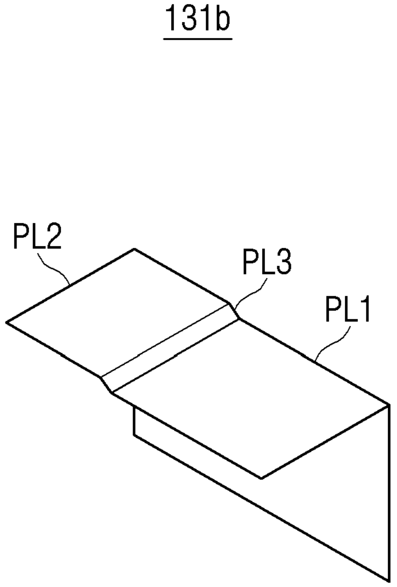
FIG. 6 is a perspective view of a slope shield according to an embodiment of the present disclosure.
Figure 7:
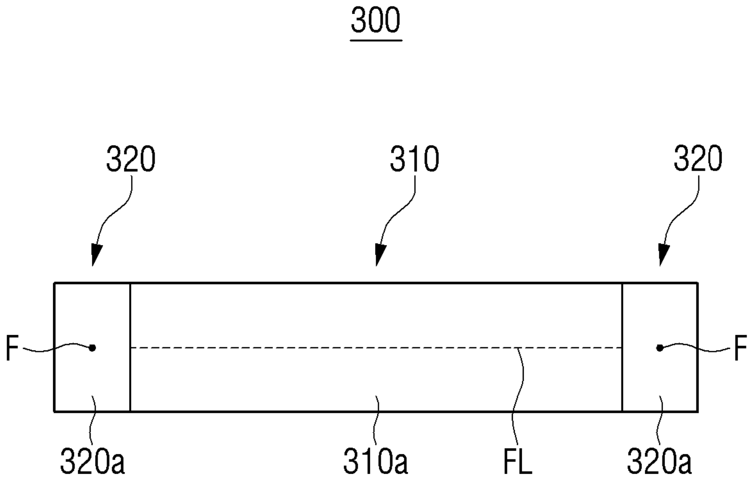
FIG. 7 is a front view of a lens according to an embodiment of the present disclosure.
Figure 8:
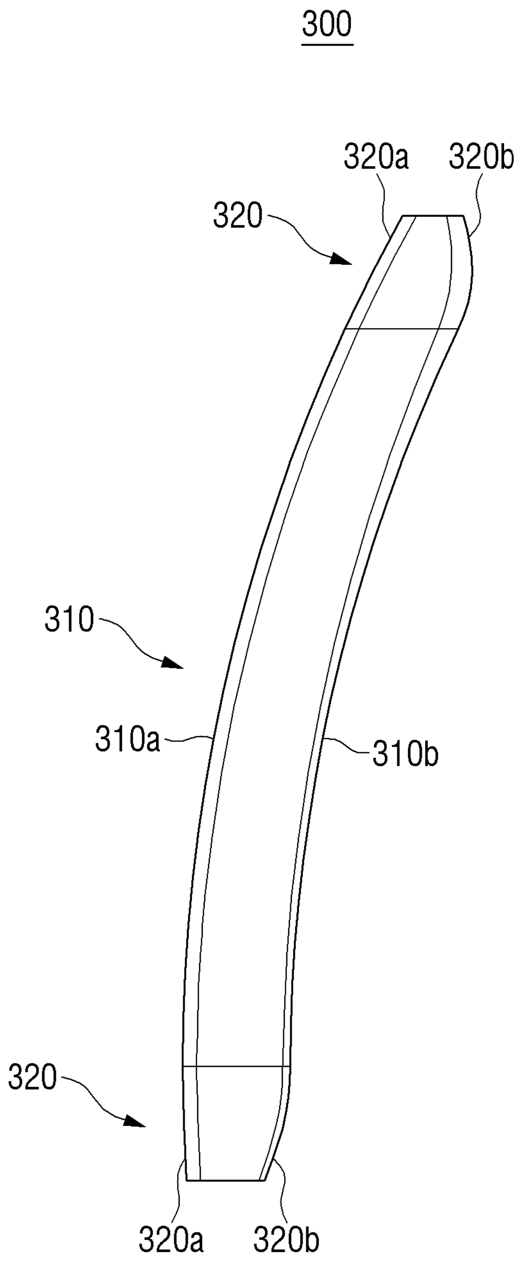
FIG. 8 is a plan view of the lens according to an embodiment of the present disclosure.

FIG. 4 is a perspective view illustrating a lamp for a vehicle according to an embodiment of the present disclosure, FIG. 5 is a perspective view of a spread shield, FIG. 6 is a perspective view of a slope shield, FIG. 7 is a front view of a lens, and FIG. 8 is a plan view of the lens.

Referring to FIG. 4, the vehicle lamp 10 according to an embodiment of the present disclosure may include a first beam pattern formation part 100, a second beam pattern formation part 200, and a lens 300.

The first beam pattern formation part 100 may emit first light for providing the first beam pattern LP, and the second beam pattern formation part 200 may emit second light for providing the second beam pattern HP different from the first beam pattern LP.

The first beam pattern formation part 100 may include a first light source 110, a first reflector 120, and shields 131*a*, 131*b*, and 132. The first light source 110 may emit first light. The first light source 110 may be implemented as a light emitting module that generates light and may be one of a light emitting diode (LED), laser, a bulb type light source, or the like. The first reflector 120 may reflect the first light emitted from the first light source 110. The light reflected by the first reflector 120 may be emitted toward the lens 300. The shields 131*a*, 131*b*, and 132 may block (e.g., obstruct) a portion of the first light emitted from the first light source 110 toward the lens 300. In other words, the shields 131*a*, 131*b*, and 132 may block a portion of the first light reflected from the first reflector 120 and emitted toward the lens 300.

Referring to FIGS. 4 to 6, the shields 131*a*, 131*b* and 132 may include spot shields 131*a* and 131*b* and a spread shield 132. The spot shields 131*a* and 131*b* may block a portion of the incident light to provide the spot pattern ST. The spread shield 132 may block a portion of the incident light to provide the spread pattern SD.

Referring to FIG. 5, the spread shield 132 may include a blocking panel PL to block a portion of the incident light. The blocking panel PL may be bent or provided in a substantially flat shape without a significant curvature, and an edge thereof may have a linear shape. Thus, the light that proceeds past the spread shield 132 may provide a beam pattern with a boundary having a linear shape.

In an embodiment of the present disclosure, the spot shields 131*a* and 131*b* may include a boundary shield 131*a* and a slope shield 131*b*. The boundary shield 131*a* may block a portion of the incident light to provide the upper boundary lines BL1 and BL2 of the spot pattern ST. The slope shield 131*b* may block a portion of the incident light for providing the upper boundary lines BL1 and BL2 and the slope line SL of the spot pattern ST. Although FIG. 5 illustrates the spread shield 132, the boundary shield 131*a* may also include a planar blocking panel PL having an edge of a linear shape, like the spread shield 132.

Referring to FIG. 6, the slope shield 131*b* may include a first blocking panel PL1, a second blocking panel PL2, and a third blocking panel PL3. Each of the first blocking panel PL1 and the second blocking panel PL2 may be bent or provided in a substantially flat shape without a significant curvature, and an edge thereof may have a linear shape. Thus, each of the light that proceeds past the first blocking panel PL1 and the second blocking panel PL2 may form a beam pattern with a boundary having a linear shape.

Each of the first blocking panel PL1 and the second blocking panel PL2 may be disposed so that wide surfaces (e.g., major surfaces) thereof are parallel to each other. Thus, the upper boundaries of the light that proceeds beyond the first blocking panel PL1 and the second blocking panel PL2 may be parallel to each other, thereby providing the first boundary line BL1 and the second boundary line BL2.

The third blocking panel PL3 may be provided between the first blocking panel PL1 and the second blocking panel PL2. The third blocking panel PL3 may connect the first blocking panel PL1 and the second blocking panel PL2. The third blocking panel PL3 may connect one edge of the first blocking panel PL1 with one edge of the second blocking panel PL2. The third blocking panel PL3 may be disposed so that a wide surface thereof (e.g., a major surface) is disposed to be inclined with respect to the wide surfaces of the first blocking panel PL1 and the second blocking panel PL2. As described above, the upper boundaries of the light that proceeds past the first blocking panel PL1 and the second blocking panel PL2 may define the boundary lines BL1 and BL2 of the spot pattern ST. A boundary of the light that proceeds past the third blocking panel PL3 may define the slope line SL of the spot pattern ST.

The vehicle lamp 10 according to the embodiment of the present disclosure may be disposed at each of left and right sides of the vehicle 20. Hereinafter, the vehicle lamp 10 disposed at the left side of the vehicle 20 is referred to as a first vehicle lamp, and the vehicle lamp 10 disposed at the right side of the vehicle 20 is referred to as a second vehicle lamp. Each of the first vehicle lamp and the second vehicle lamp may include a slope shield 131*b* and a boundary shield 131*a*. Hereinafter, the slope shield 131*b* and the boundary shield 131*a* provided in the first vehicle lamp are referred to as a first slope shield and a first boundary shield, respectively, and the slope shield 131*b* and the boundary shield 131*a* provided in the second vehicle lamp are referred to as a second slope shield and a second boundary shield, respectively.

In a configuration where the first slope shield is disposed closer to a vehicle centerline parallel to the longitudinal axis of the vehicle 20 than the first boundary shield, the second slope shield may be disposed farther from the vehicle centerline than the second boundary shield. Alternatively, in a configuration where the first slope shield is disposed farther from the vehicle centerline than the first boundary shield, the second slope shield may be disposed closer to the vehicle centerline than the second boundary shield.

Referring back to FIG. 4, the second beam pattern formation part 200 may include a second light source 210 and a second reflector 220. The second light source 210 may emit second light. The second light source 210 may be implemented as a light emitting module that generates light and may be one of a light emitting diode (LED), laser, a bulb type light source or the like. The second reflector 220 may reflect the second light emitted from the second light source 210. The light reflected by the second reflector 220 may be emitted toward the lens 300.

The lens 300 may transmit the first light and the second light to provide a first beam pattern LP and a second beam pattern HP. When the first light passes through the lens 300, the first beam pattern LP may be provided, and when the second light passes through the lens 300, the second beam pattern HP may be provided. The lens 300 may transmit both the first light of the first beam pattern formation part 100 and the second light of the second beam pattern formation part 200. As described above, the first beam pattern LP may include a spot pattern ST and a spread pattern SD. The spot pattern ST represents a beam pattern having higher light concentration than the spread pattern SD.

The first light source 110 providing the first beam pattern LP may be provided in plurality. A portion of the plurality of first light sources 110 may be used to provide the spot pattern ST, and the rest may be used to provide the spread pattern SD. Here, the first light source used to provide the spot pattern ST (hereinafter, referred to as a spot light source) and the first light source used to provide the spread pattern SD (hereinafter, referred to as a spread light source) may provide substantially the same performance. For example, the spot light source and the spread light source may emit light having substantially the same brightness.

The lens 300 may include portions having different light concentration powers to allow the light from the spot light source and the spread light source having substantially the same performance to provide light areas having different concentrations. In the lens 300, the light transmitted through a portion having a relatively higher concentration power may provide the spot pattern ST, and the light transmitted through a portion having a relatively lower concentration power may provide the spread pattern SD. In addition, the light transmitted through the portion having a relatively lower concentration power may provide the second beam pattern HP.

Referring to FIGS. 7 and 8, the lens 300 may include a spread lens 310 and a spot lens 320. The spread lens 310 may concentrate the incident light to a line, and the spot lens 320 may concentrate the incident light to a point. The light transmitted through the spread lens 310 may provide the spread pattern SD, and the light transmitted through the spot lens 320 may provide the spot pattern ST. The light that passes through the spread lens 310 may provide the second beam pattern HP.

Among the first light sources 110, the light from the spread light source may pass through the spread lens 310 to provide the spread pattern SD of the first beam pattern LP, and the light from the second light source 210 may pass through the spread lens 310 to provide the second beam pattern HP. In addition, the light from the spot light source among the first light sources 110 may pass through the spot lens 320 to provide the spot pattern ST of the first beam pattern LP.

The spread lens 310 may have an elongated shape that is extended in one direction. For example, the spread lens 310 may have an elongated shape that is substantially parallel to the ground (i.e., lateral direction of the vehicle). The spot lens 320 may be disposed on both sides of the spread lens 310. The spot lenses 320 may be disposed at both ends of the spread lens 310 in a longitudinal direction.

Referring to FIGS. 7 and 8, light emission surfaces 310*a* and 320*a* of the lens 300 may have a continuous curvature over the entire area. In other words, the light emission surfaces 310*a* and 320*a* of the lens 300 may not include a discontinuous boundary over the entire area, and thus, the curvature may be continuously provided even at the interface between the light emission surfaces 310*a* and 320*a* of the spread lens 310 and the spot lens 320. In an embodiment of the present disclosure, the continuous curvature may mean that curvatures of adjacent areas are the same as or similar to one another and are not changed abruptly. In other words, the light emission surfaces 310*a* and 320*a* may be differentiable across the entire contour.

In some embodiments, however, the light emission surfaces 310*a* and 320*a* of the lens 300 may include at least one section having a discontinuous curvature (e.g., a non-differentiable contour). Hereinafter, the light emission surfaces 310*a* and 320*a* of the lens 300 will mainly be described as having the continuous curvature over the entire area.

As the light emission surfaces 310*a* and 320*a* of the lens 300 have the continuous curvature over the entire area, the vehicle lamp 10 may be observed as one surface corresponding to the light emission surfaces 310*a* and 320*a* of the lens 300 when viewed from the outside. Both the first beam pattern LP and the second beam pattern HP may be implemented through a single surface observed from the outside.

In some embodiments, however, the light emission surfaces 310*a* and 320*a* of the lens 300 may include at least one section having a discontinuous curvature. In this case, a plurality of surfaces of the light emission surfaces 310*a* and 320*a* may be observed based on one or more boundaries corresponding to the discontinuous curvature (e.g., non-differentiable contour).

The spread lens 310 may provide a focal line FL such that the incident light is concentrated to a line, and the spot lens 320 may provide a focal point F such that the incident light is concentrated to a point. When the incident light passes through the spread lens 310, an elongated spread pattern SD may be disposed to be parallel to the longitudinal (e.g., horizontal) direction of the spread lens 310, and when the incident light passes through the spot lens 320, a spot pattern ST having relatively similar horizontal and vertical dimensions may be provided.

As illustrated in FIG. 8, the light emission surface 310*a* and a light incident surface 310*b* of the spread lens 310 may have similar or identical curvatures. Thus, the light transmitted through the spread lens 310 may be emitted with little change in concentration or may be concentrated in a vertical direction and diffused in a horizontal direction.

In order to concentrate the incident light, the spot lens 320 may be provided in the form of a convex lens. For example, the spot lens 320 may be provided in the form of an aspherical lens.

In order for the light emission surfaces 310*a* and 320*a* of the lens 300 to be observed as a single surface, the light emission surface 320*a* of the spot lens 320 may be required to have a curvature similar to that of the light emission surface 310*a* of the spread lens 310. Accordingly, it may be more difficult to implement the light emission surface 310*a* of the spread lens 310 in a convex shape.

Thus, a light incident surface 320*b* of the spot lens 320 may be formed to have an outwardly convex shape. Since the light incident surface 320*b* of the spot lens 320 may have the convex shape, the spot lens 320 may concentrate the incident light.

The light incident surface 310*b* of the spread lens 310 and the light incident surface 320*b* of the spot lens 320 may be continuously connected to each other. A curvature may be continuously provided at an interface between the light incident surface 310*b* of the spread lens 310 and the light incident surface 320*b* of the spot lens 320. As the curvature is continuously provided at the interface between the light incident surface 310*b* of the spread lens 310 and the light incident surface 320*b* of the spot lens 320, a sense of heterogeneity between the beam pattern of the light transmitted through the spread lens 310 and the beam pattern of the light transmitted through the spot lens 320 may be reduced or minimized.

The curvature of the light incident surface 320*b* of the spot lens 320 may be greater than that of the light incident surface 310*b* of the spread lens 310 (i.e., the radius of curvature of the light incident surface 320*b* of the spot lens 320 may be smaller than the radius of curvature of the light incident surface 310*b* of the spread lens 310). Thus, the focal length of the spot lens 320 may be less than that of the spread lens 310.

Figure 9:
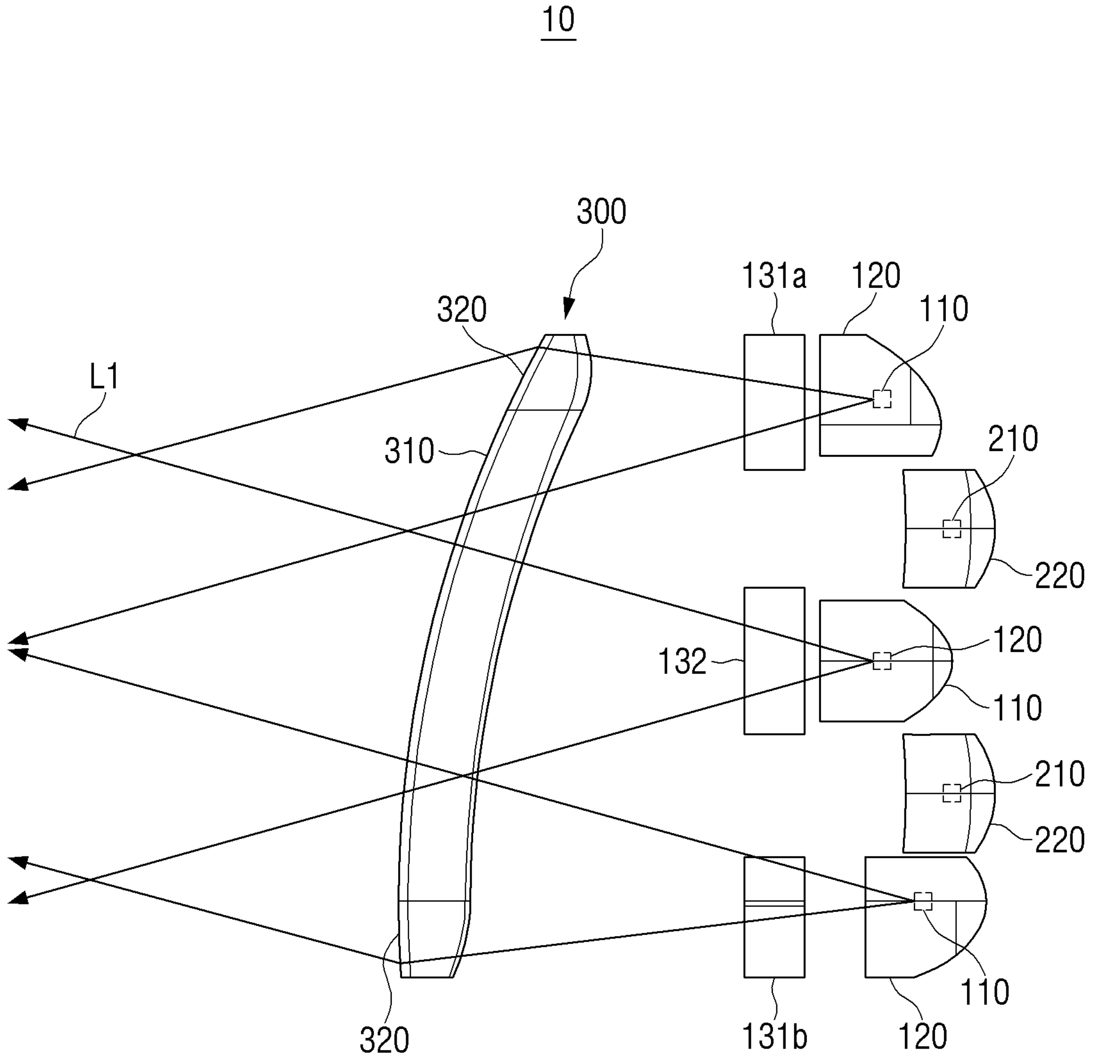
FIG. 9 is a view illustrating a state in which light is emitted to form a first beam pattern in the lamp for the vehicle according to an embodiment of the present disclosure.
Figure 10:
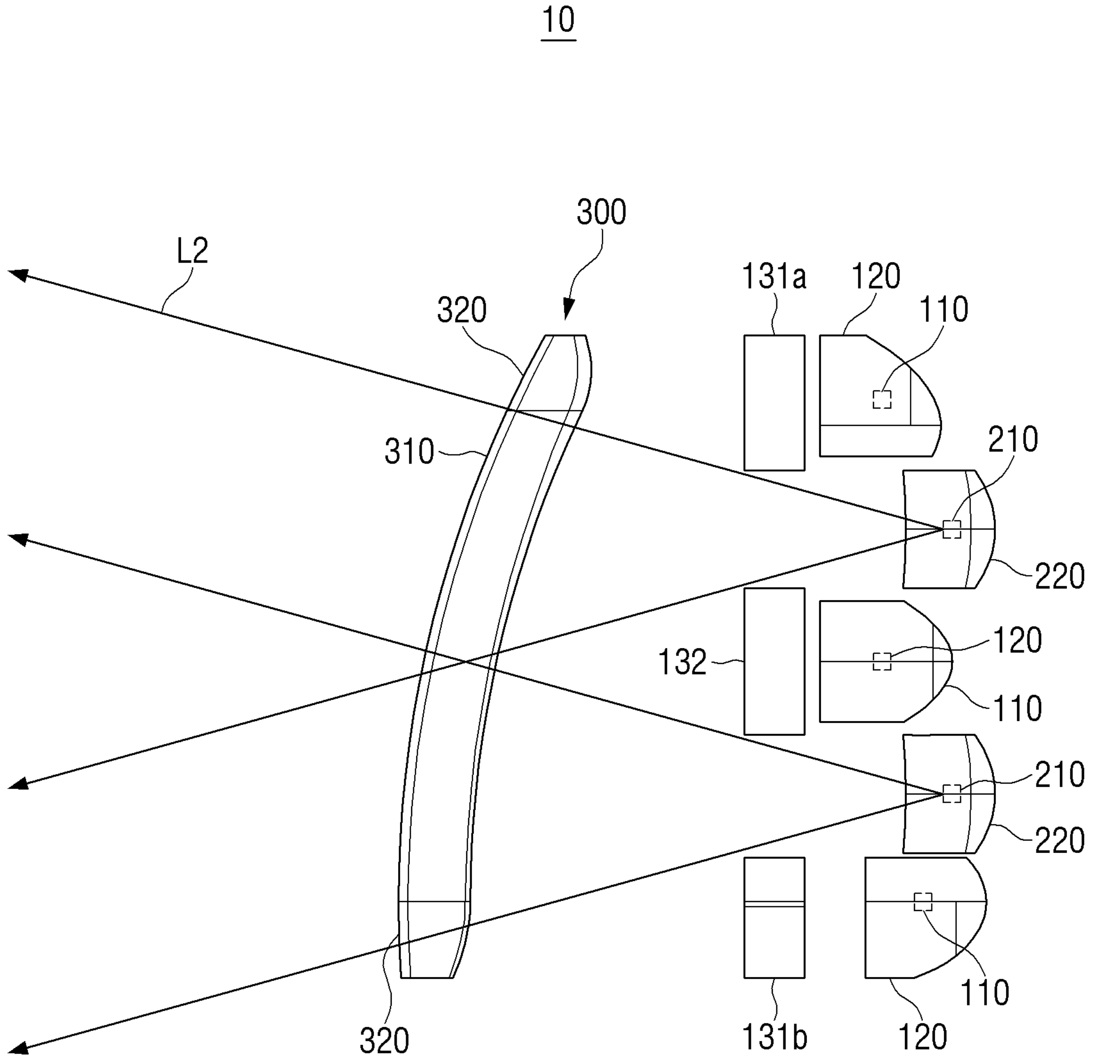
FIG. 10 is a view illustrating a state in which light is emitted to form a second beam pattern in the lamp for the vehicle according to an embodiment of the present disclosure.

FIG. 9 is a view illustrating a state in which the light is emitted to form the first beam pattern in the lamp for the vehicle, and FIG. 10 is a view illustrating a state in which the light is emitted to form the second beam pattern in the lamp for the vehicle.

Referring to FIG. 9, first light L1 emitted from the first beam pattern formation part 100 may pass through the lens 300. The first light L1 transmitted through the lens 300 may provide a first beam pattern LP. The light from the spread light source among the first light sources 110 of the first beam pattern formation part 100 may pass through the spread lens 310 to provide the spread pattern SD. In addition, the light of the spot light source among the first light sources 110 of the first beam pattern formation part 100 may pass through the spot lens 320 to provide a spot pattern ST.

The spot lens 320 may be provided at both ends of the spread lens 310, and the first light source 110 for emitting light to each spot lens 320 may be individually provided. The light of the first light source 110 corresponding to the spot lens 320 of one side may be reflected by the first reflector 120 and then pass through a boundary shield 131*a* so as to be emitted to the spot lens 320 of the one side. The light from the first light source 110 corresponding to the spot lens 320 of the other side may be reflected by the first reflector 120 and then pass through the slope shield 131*b* so as to be emitted to the spot lens 320 of the other side.

The light transmitted through both spot lenses 320 may provide the spot pattern ST of the first beam pattern LP. Among the light, the light that passes through the slope shield 131*b* may provide boundary lines BL1 and BL2 and the slope line SL of the spot pattern ST.

A slope shield 131*b* may be disposed to correspond to one of the spot lenses 320 disposed on both sides of the spread lens 310. In other words, among the spot lenses 320 disposed on both sides of the spread lens 310, the slope shield 131*b* may be disposed to correspond to the spot lens 320 disposed at one side, and the boundary shield 131*a* may be disposed to correspond to the spot lens 320 disposed at the other side.

The light from the spread light source among the first light sources 110 may pass through the spread lens 310. The light may provide a spread pattern SD of the first beam pattern LP.

The first reflector 120 may reflect the first light emitted from the first light source 110 to the spot lens 320. The first reflector 120 may be provided in plurality, and the first light may be reflected to each of the spot lenses 320 disposed on both sides of the spread lens 310 by at least one first reflector 120. For example, at least one first reflector 120 may reflect the first light to the spot lens 320 disposed at one side of the spread lens 310, and at least one first reflector 20 may reflect the first light to the spot lens 320 disposed at the other side of the spread lens 310. FIG. 9 is a view illustrating a state in which each first reflector 120 reflects the first light to each of the spot lenses 320.

Referring to FIG. 10, the second light L2 emitted from the second beam pattern formation part 200 may pass through the lens 300. The second light L2 transmitted through the lens 300 may provide a second beam pattern HP.

Each of the first light source 110 and the second light source 210 may be provided in plurality. Likewise, each of the first reflector 120 and the second reflector 220 may be provided in plurality. The plurality of first light sources 110 and the plurality of second light sources 210 may be arranged side by side along the longitudinal (e.g., width) direction of the lens 300. In addition, the plurality of first reflectors 120 and the plurality of second reflectors 220 may be arranged side by side along the longitudinal direction of the lens 300.

The first reflector 120 and the second reflector 220 may be alternately disposed. As such, the second reflector 220 may be disposed adjacent to the first reflector 120, and the first reflector 120 may be disposed adjacent to the second reflector 220.

The first reflector 120 may be disposed more proximate to the lens 300 compared to the second reflector 220. Accordingly, the first beam pattern formation part 100 may emit light from a distance that is relatively closer to the lens 300 than the second beam pattern formation part 200. Since the second beam pattern formation part 200 emits light to the lens 300 from a relatively farther distance, the second beam pattern HP may be provided over a relatively wider area compared to the first beam pattern LP.

Figure 11:
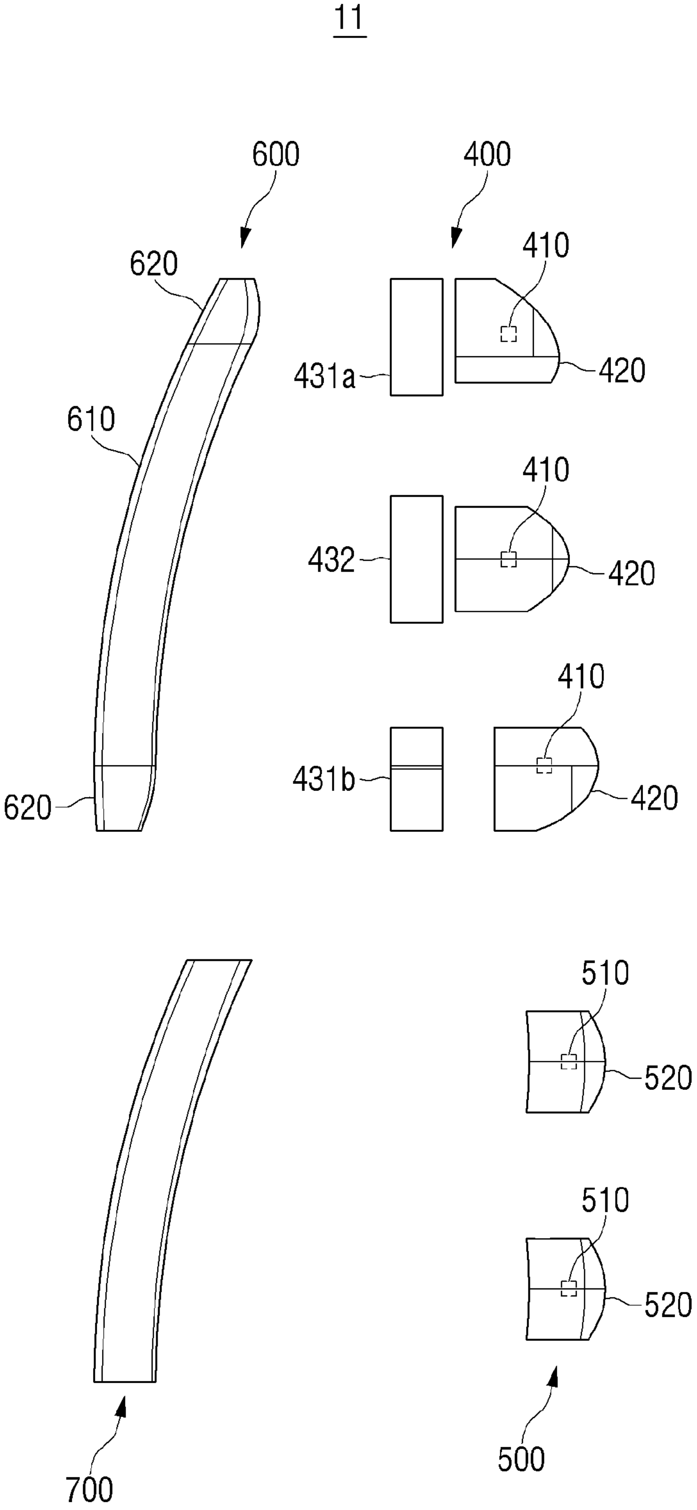
FIG. 11 is a view illustrating a lamp for a vehicle according to another embodiment of the present disclosure.

FIG. 11 is a view illustrating a lamp for a vehicle according to another embodiment of the present disclosure. Referring to FIG. 11, a vehicle lamp 11 according to another embodiment of the present disclosure may include a first beam pattern formation part 400, a second beam pattern formation part 500, and lenses 600 and 700. The first beam pattern formation part 400 may emit first light for providing the first beam pattern LP, and the second beam pattern formation part 500 may emit second light for providing the second beam pattern HP different from the first beam pattern LP.

The first beam pattern formation part 400 may include a first light source 410, a first reflector 420, and shields 431*a*, 431*b*, and 432. The shields 431*a*, 431*b*, and 432 may include spot shields 431*a* and 431*b* and a spread shield 432. Here, the spot shields 431*a* and 431*b* may include a boundary shield 431*a* and a slope shield 431*b*.

Since shapes and functions of the first light source 410, the first reflector 420, and the shields 431*a*, 431*b*, and 432 are the same as or similar to those of the first light source 110, the first reflector 120, and the shields 131*a*, 131*b*, and 132, which are described above, their detailed descriptions will be omitted.

The second beam pattern formation part 500 may include a second light source 510 and a second reflector 520. Since shapes and functions of the second light source 510 and the second reflector 520 are the same as or similar to those of the second light source 210 and the second reflector 220, which are described above, their detailed descriptions will be omitted.

The lenses 600 and 700 may include a first lens 600 and a second lens 700. The first lens 600 may transmit the first light to provide the first beam pattern LP, and the second lens 700 may transmit the second light to provide the second beam pattern HP. Light emitted from the first beam pattern formation part 400 may pass through the first lens 600, and light emitted from the second beam pattern formation part 500 may pass through the second lens 700.

The first beam pattern formation part 400 and the second beam pattern formation part 500 may be disposed adjacent to each other while being separated from each other. However, the first light emitted from the first beam pattern formation part 400 may not be incident into the second lens 700, and the second light emitted from the second beam pattern formation part 500 may not be incident into the first lens 600. Therefor, a light blocking membrane may be provided to prevent the first light from being incident into the second lens 700 and to prevent the second light from being incident into the first lens 600.

The first lens 600 may include a spread lens 610 and a spot lens 620. The spread lens 610 may concentrate the incident light in a vertical direction and diffuse the incident light in a horizontal direction. The spot lens 620 may concentrate the incident light in vertical and horizontal directions. Since shapes and functions of the spread lens 610 and the spot lens 620 are the same as or similar to those of the spread lens 310 and the spot lens 320, which are described above, their detailed descriptions will be omitted.

The second lens 700 may include only a spread lens that concentrates the incident light only in the vertical direction and diffuses the incident light in the horizontal direction.

Thus, the second lens 700 may transmit or diffuse the incident light without concentrating in the horizontal direction.

Figure 12:
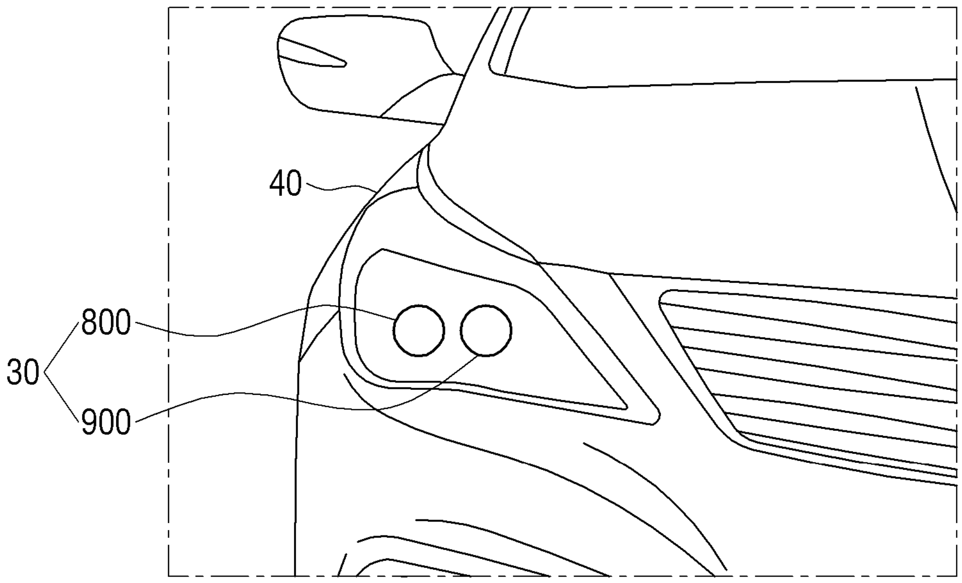
FIG. 12 is a view illustrating the lamp for the vehicle when viewed from a front side of the vehicle according to an embodiment of the present disclosure.
Figure 13:
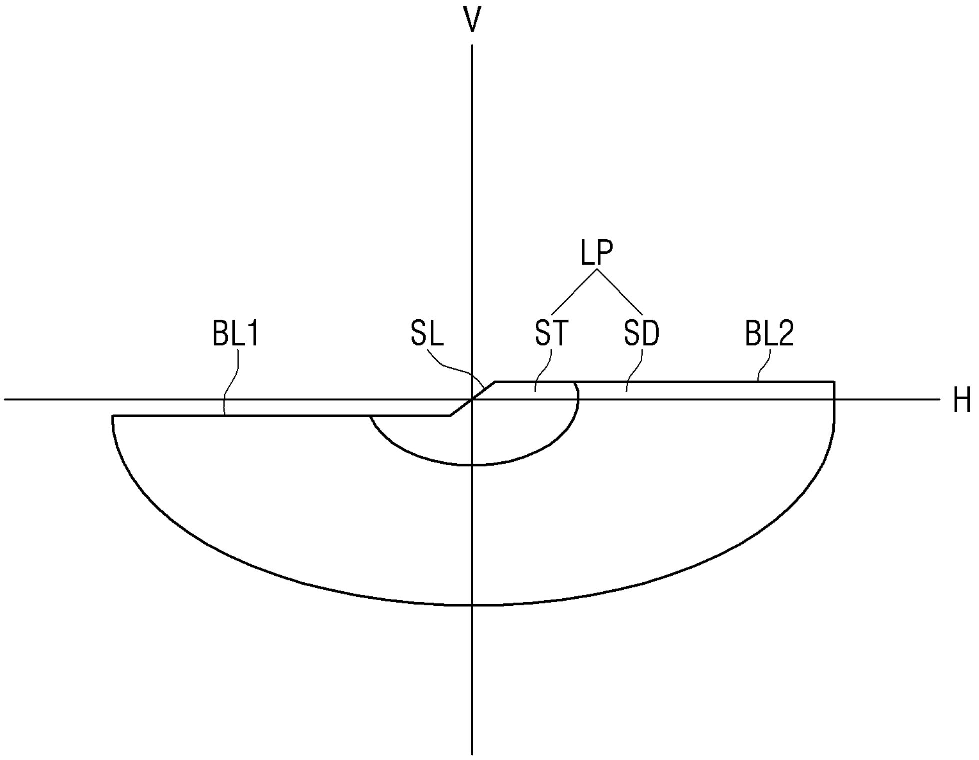
FIG. 13 is an example of a first beam pattern to be formed by the lamp for vehicle according to an embodiment of the present disclosure.
Figure 14:
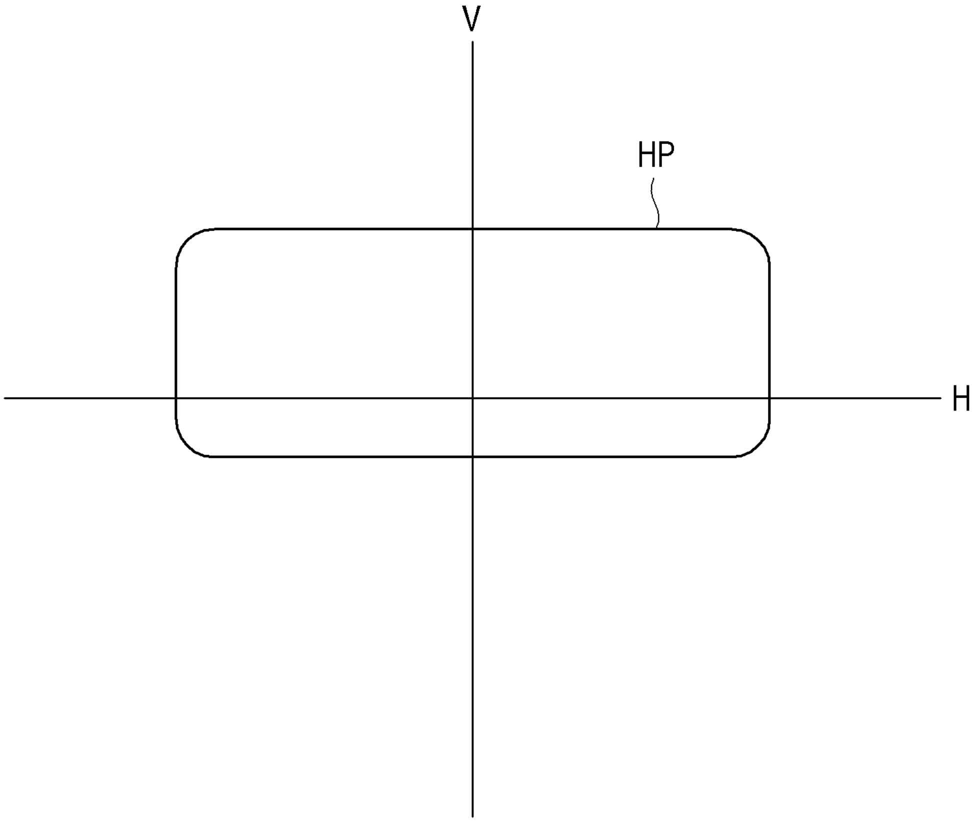
FIG. 14 is an example of a second beam pattern to be formed by the lamp for vehicle according to an embodiment of the present disclosure.

FIG. 12 is a view illustrating the lamp for the vehicle when viewed from a front side of the vehicle, FIG. 13 is an example of a first beam pattern, and FIG. 14 is an example of a second beam pattern. Referring to FIG. 12, a vehicle lamp 30 according to an embodiment of the present disclosure may include a first beam pattern formation part 800 and a second beam pattern formation part 900.

In the embodiment of the present disclosure, the vehicle lamp 30 may be installed on each of both front sides of a vehicle 40 to secure a forward view when the vehicle 40 is operated in low-light conditions (e.g., at night or in a dark place such as a tunnel). Thus, a case in which the vehicle lamp 30 is used as a head lamp will be mainly described. However, this is merely an example to help understanding of the present disclosure, and the vehicle lamp 30 according to the another embodiment of the present disclosure is not limited to the head lamp, and may be used for various lamps installed in the vehicle 40, such as fog lamps, tail lamps, brake lamps, turn signal lamps, position lamps, daytime running lamps, and the like.

The vehicle lamp 30 may include a first beam pattern LP (see FIG. 13) to secure a near-field view in front of the vehicle and a second beam pattern HP (see FIG. 13) to secure a far-field view in front of the vehicle. The first beam pattern LP may include a low beam pattern, and the second beam pattern HP may include a high beam pattern.

The first beam pattern formation part 800 may radiate light to provide the first beam pattern LP, and the second beam pattern formation part 900 may radiate light to provide the second beam pattern HP different from the first beam pattern LP. The first beam pattern formation part 800 and the second beam pattern formation part 900 may be disposed adjacent to each other. The first beam pattern LP may secure a near-field view in front of the vehicle 40, and the second beam pattern HP may secure a far-field view in front of the vehicle 40.

Referring to FIG. 13, the first beam pattern LP may include a spread pattern SD and a spot pattern ST. The spread pattern SD may be provided in a relatively wider size, and the spot pattern ST may be provided in a relatively smaller size than the spread pattern SD. The spot pattern ST may overlap the spread pattern SD. An area on which the spot pattern ST overlaps the spread pattern SD may be an area on which the light is more concentrated. Hereinafter, this area is referred to as a concentrated light area, and an area defined by only the spread pattern SD outside the concentrated light area is referred to as a diffused light area. Since the concentrated light area is provided by allowing the spread pattern SD and the spot pattern ST to overlap each other, and the diffused light area is provided by only the spread pattern SD, the concentrated light area may exhibit a higher brightness than the diffused light area.

The concentrated light area may be a beam pattern emitted onto the near-field forward area on which the driver's attention is focused, and thus, the near-field forward illumination of the vehicle 40 may be secured more readily by the concentrated light area.

Cutoff lines BL1, BL2, and SL may be disposed on upper boundaries of the first beam pattern LP. The cutoff lines BL1, BL2, and SL may include boundary lines BL1 and BL2 and a slope line SL. The boundary lines BL1 and BL2 may include a first boundary line BL1 and a second boundary line BL2. The first boundary line BL1 and the second boundary line BL2 may define an upper boundary of the first beam pattern LP. For example, the first boundary line BL1 and the second boundary line BL2 may be disposed to be parallel to the ground.

The slope line SL may be provided in a direction inclined with respect to a longitudinal direction of the first boundary line BL1 and the second boundary line BL2 to connect the first boundary line BL1 and the second boundary line BL2. Thus, the first boundary line BL1 and the second boundary line BL2 may have different heights (e.g., different vertical positions). FIG. 13 is a view illustrating a state in which the second boundary line BL2 is provided higher than the first boundary line BL1.

According to some embodiments of the present disclosure, the cutoff line may include only the boundary line and may include no slope line. In this case, one boundary line may define an upper boundary of the first beam pattern LP. Hereinafter, it will be mainly described that the cutoff lines include all of the boundary lines BL1 and BL2 and the slope line SL.

Referring to FIG. 14, the second beam pattern HP may represent a beam pattern emitted to a longer-distance forward area. When the second beam pattern HP is provided by the second beam pattern formation part 900, the far-field forward view of the vehicle 40 may be secured more readily.

Figure 15:
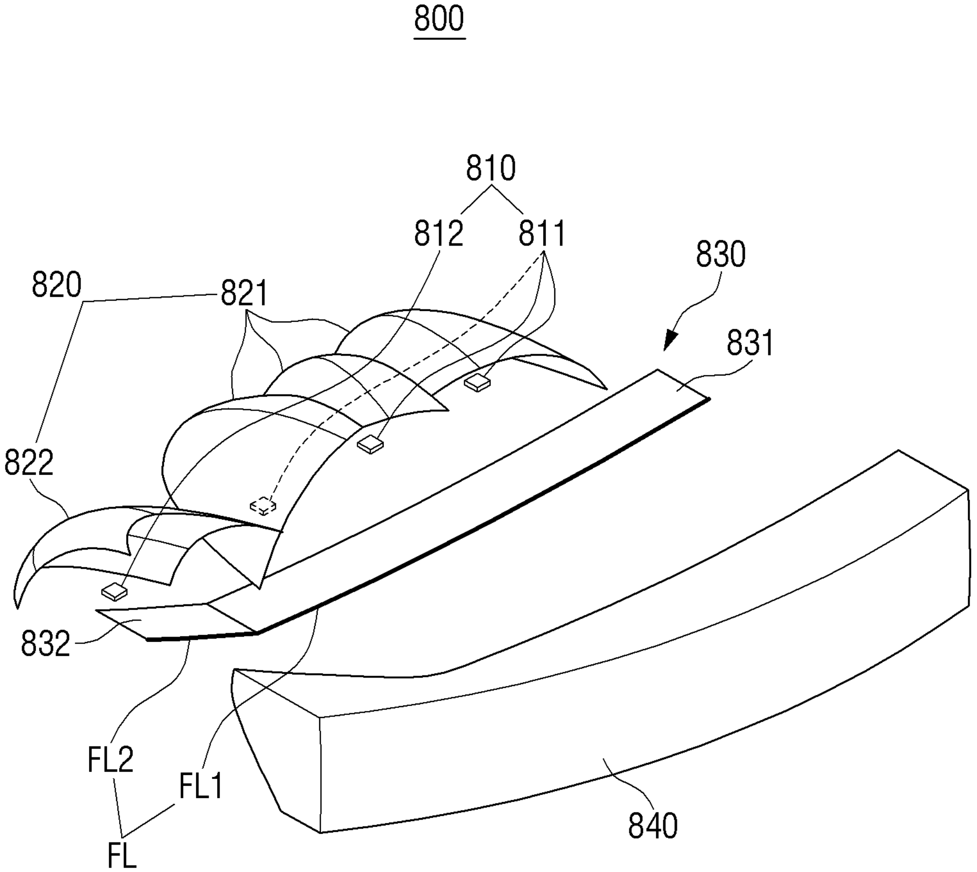
FIG. 15 is a perspective view illustrating a first beam pattern formation part illustrated in FIG. 12.

FIG. 15 is a perspective view of the first beam pattern formation part according to the embodiment shown in FIG. 11. Referring to FIG. 15, a first beam pattern formation part 800 according to an embodiment of the present disclosure may include a light source part 810, a reflector 820, a shield 830, and a lens 840.

The light source part 810 may emit light for providing the first beam pattern LP. The light source part 810 may include a plurality of light sources 811 and 812. The light sources 811 and 812 may be implemented as light emitting modules that generate light and may be one of a light emitting diode (LED), laser, a bulb type light source, or the like. The first beam pattern LP may be provided by light emitted from the plurality of light sources 811 and 812.

The reflector 820 may reflect the light emitted from the light source part 810. The reflector 820 may include a plurality of reflection parts 821 and 822 corresponding to the plurality of light sources 811 and 812. The light emitted from one light source 811 or 812 may be reflected by the corresponding reflection part 821 or 822.

The lens 840 may transmit the light reflected by the reflector 820 to provide the first beam pattern LP. The light transmitted through the lens 840 and emitted to the front of the vehicle 40 may provide the first beam pattern LP.

As described above, the first beam pattern LP may be a beam pattern emitted toward a shorter-distance forward area of the vehicle 40 and may include cutoff lines BL1, BL2, and SL. A shield 830 may be disposed on a light emitting path of the reflector 820 to provide the cutoff lines BL1, BL2, and SL. The shield 830 may block a portion of the light emitted from the reflector 820 toward the lens 840. As the light that is not blocked by the shield 830 is transmitted through the lens 840, the first beam pattern LP including the cutoff lines BL1, BL2, and SL may be provided.

The lens 840 may provide a kinked focal line. Specifically, the lens 840 may provide a first focal line FL1 and a second focal line FL2, which extend in different directions when viewed from the front (see FIG. 19). The first focal line FL1 may extend in a horizontal direction, and the second focal line FL2 may extend in an obliquely upward direction from the first focal line FL1.

According to some embodiments of the present disclosure, the second focal line FL2 may extend from the first focal line FL1 in an obliquely downward direction. Hereinafter, the second focal line FL2 that extends in the obliquely upward direction from the first focal line FL1 will be mainly described.

In an embodiment of the present disclosure, the focal line may indicate that the focus of the lens 840 forms a line. As the lens 840 provided in the first beam pattern formation part 800 has an elongated shape in one direction, the focus defined by the lens 840 may also be provided in an elongated line shape.

The shield 830 may have a shape corresponding to each of the first focal line FL1 and the second focal line FL2. The shield 830 may be provided in the form of a plate that is substantially parallel to a direction of light emitted from the reflector 820 to the lens 840. The focal line FL of the lens 840 may be provided to correspond with a boundary (hereinafter, referred to as a focal boundary) of the shield 830 adjacent to the lens 840. The focal boundary of the shield 830 and the focal line FL of the lens 840 may or may not coincide with each other. Even when the focal boundary and the focal line FL do not coincide, the focal line FL may be provided adjacent to the focal boundary. As the focal boundary and the focal line FL coincide with each other or are adjacent to each other, the cutoff lines BL1, BL2, and SL of the first beam pattern LP may be more clearly defined. Hereinafter, the state in which the focal boundary and the focal line FL coincide will be mainly described.

The shield 830 may include a first shield part 831 and a second shield part 832. A first focal line FL1 may be provided on a focal boundary of the first shield part 831, and a second focal line FL2 may be provided on a focal boundary of the second shield part 832.

The second focal line FL2 may extend from an end of the first focal line FL1 in the obliquely upward direction. Similarly, the second shield part 832 may extend from an end of the first shield part 831 in the obliquely upward direction.

The light emitted to the first focal line FL1 may be used to provide the first boundary line BL1 and the second boundary line BL2 among the cutoff lines BL1, BL2, and SL, and the light emitted to the second focal line FL2 may be used to provide the slope line SL among the cutoff lines BL1, BL2, and SL. As the first shield part 831 and the second shield part 832 are disposed to correspond to shapes of the first focal line FL1 and the second focal line FL2, the light emitted thereto may proceed beyond the shield 830, to the lens 840. The light that proceeds past the shield 830 and incident to the lens 840 may more clearly provide the boundary lines BL1 and BL2 and the slope line SL of the first beam pattern LP.

Figure 16:
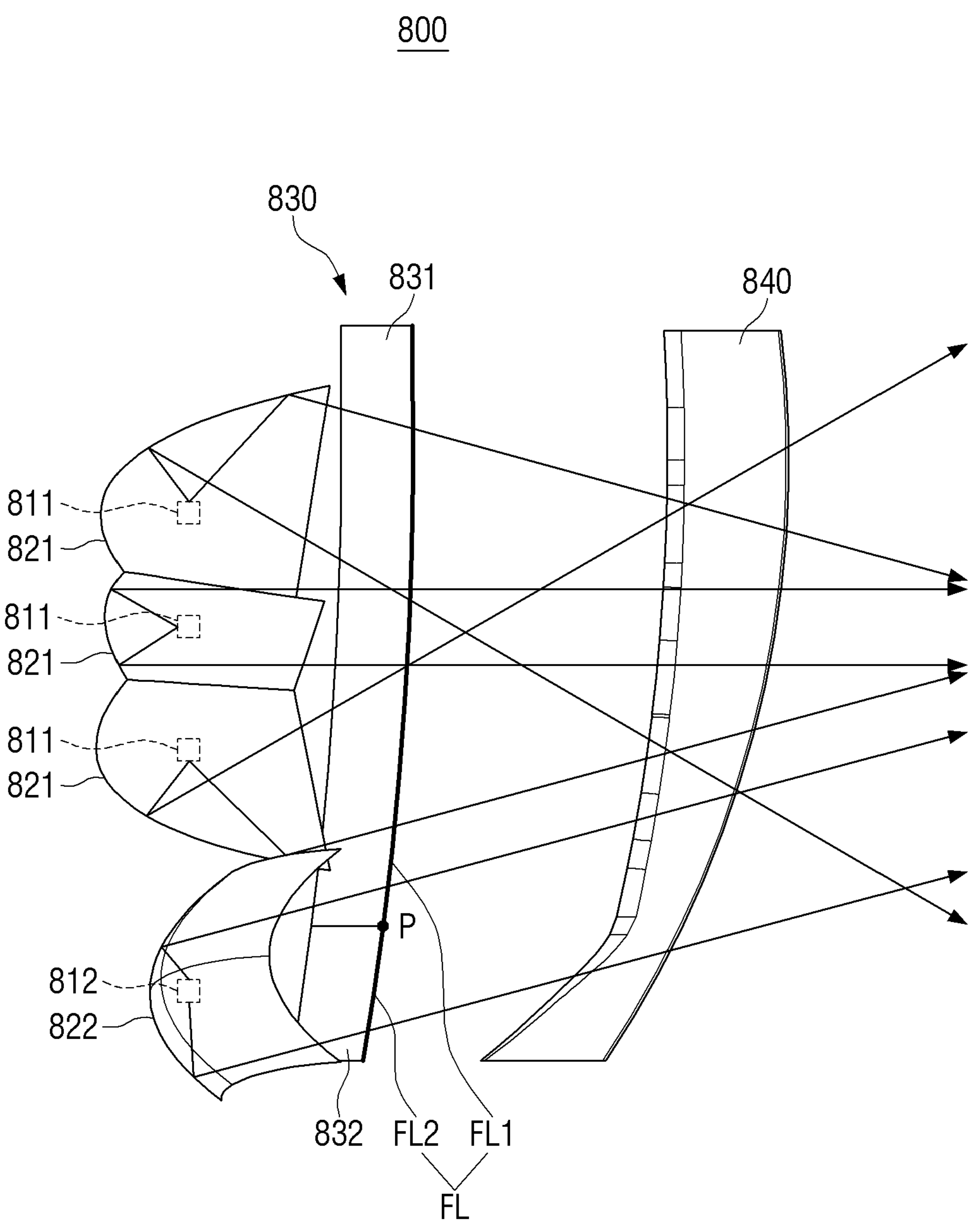
FIG. 16 is a view depicting the light emitted by the first beam pattern formation part according to an embodiment of the present disclosure.

FIG. 16 is a view depicting the light emitted by the first beam pattern formation part. Referring to FIG. 16, the first beam pattern formation part 800 may emit light to provide the first beam pattern LP.

The plurality of light sources 811 and 812 included in a light source part 810 may emit light. The light emitted from the plurality of light sources 811 and 812 may be reflected by reflection parts 821 and 822 of the reflector 820 and then emitted toward the lens 840.

A shield 830 may be provided between the reflector 820 and the lens 840. The shield 830 may block a portion of the light emitted from the reflector 820 toward the lens 840. The focal line FL of the lens 840 may be provided on a focal boundary of the shield 830. The light emitted from the reflector 820 may be blocked to correspond to the shape of the focal boundary and then emitted to the lens 840. Thus, the first beam pattern LP may include a boundary having a shape corresponding to the focal boundary.

As described above, the first beam pattern LP may include a spread pattern SD and a spot pattern ST. A portion of the plurality of light sources 811 and 812 may be used to provide the spread pattern SD, and the rest may be used to provide the spot pattern ST. Hereinafter, the light source 811 used to provide the spread pattern SD is referred to as a first light source, and the light source 812 used to provide the spot pattern ST is referred to as a second light source. In addition, among the reflection parts 821 and 822 of the reflector 820, the reflection part 821 that reflects the light of the first light source 811 is referred to as a first reflector, and the reflection part 822 that reflects the light of the second light source 812 is referred to as a second reflector.

The first reflection part 821 may reflect light to pass through the first focal line FL1. The light reflected by the first reflection part 821 may pass through the first focal line FL1, and the lens 840 may be used to provide the spread pattern SD. The second reflection part 822 may reflect light to pass through the second focal line FL2. For example, the second reflection part 822 may reflect light to pass through only the second focal line FL2, without passing through the first focal line FL1.

Alternatively, according to some embodiments, the second reflection part 822 may reflect light to pass through both the first focal line FL1 and the second focal line FL2. In this case, the light reflected by the second reflection part 822 may pass through a point P at which the first focal line FL1 and the second focal line FL2 abut.

The light reflected by the second reflection part 822 to pass through the second focal line FL2 or the first and second focal lines FL1 and FL2 and the lens 840 may be used to provide the spot pattern ST. In addition, the light reflected by the second reflection part 822 to pass through the second focal line FL2 may be used to provide the slope line SL of the cutoff line, which is described above.

Figure 17:
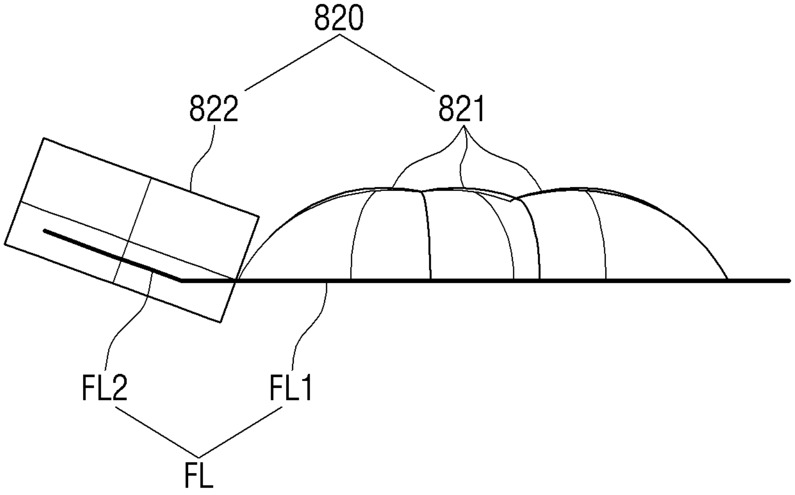
FIG. 17 is a view for explaining an arrangement relationship between a reflector and a focal line according to an embodiment of the present disclosure.

FIG. 17 is a view for explaining an arrangement relationship between the reflector and the focal line. Referring to FIG. 17, the plurality of reflection parts 821 and 822 provided in the reflector 820 may have a posture corresponding to the focal line FL. As described above, the reflector 820 may include a plurality of reflection parts 821 and 822. Among the plurality of reflection parts 821 and 822, the first reflection part 821 may be used to provide the spread pattern SD, and the second reflection part 822 may be used to provide the spot pattern ST.

At least one first reflection part 821 may be provided. When there is only one first reflection part 821, the first reflection part 821 may have an elongated shape corresponding to a longitudinal direction of the first focal line FL1. When there are plurality of first reflection parts 821, the plurality of first reflection parts 821 may be arranged side by side along the longitudinal direction of the first focal line FL1. Also, the first reflection part 821 may have a posture corresponding to the first focal line FL1. For example, when viewed from the front, a lower bound of the first reflection part 821 may be parallel to the first focal line FL1. Hereinafter, a case in which a plurality of first reflection parts 821 are provided will be described.

At least one second reflection part 822 may be provided. The second reflection part 822 may have a posture corresponding to the second focal line FL2. For example, when viewed from the front, a lower bound of the second reflection part 822 may be parallel to the second focal line FL2.

In some embodiments, however, the second reflection part 822 may have a posture corresponding to the first focal line FL1. For example, when viewed from the front, a lower bound of the second reflection part 822 may be parallel to the first focal line FL1.

Figure 18:
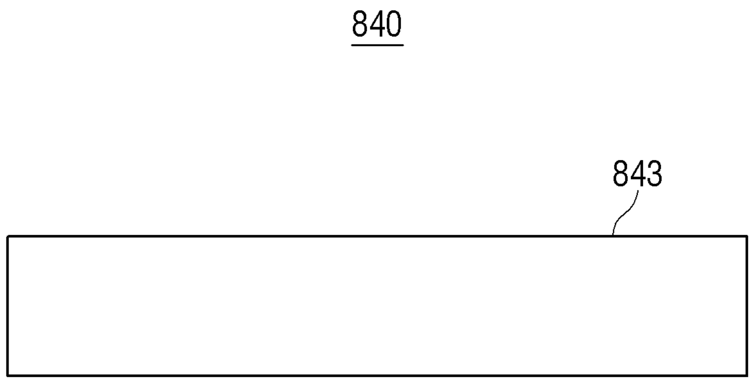
FIG. 18 is a front view of a lens according to an embodiment of the present disclosure.
Figure 19:
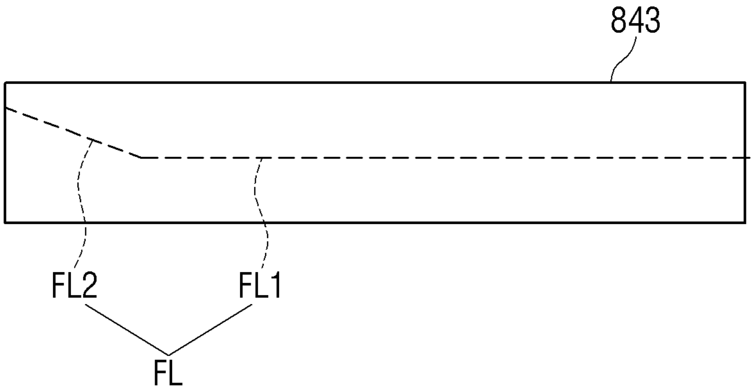
FIG. 19 is a view for depicting a focal line of the lens according to an embodiment of the present disclosure.

FIG. 18 is a front view of the lens, and FIG. 19 is a view for depicting the focal line of the lens. Referring to FIG. 18, the lens 840 may include one continuous light emission surface 843 when viewed from the front.

In other words, the light emission surface 843 of the lens 840 may not include a discontinuous boundary over the entire area. Thus, the first beam pattern formation part 800 may be observed as a single surface having a shape corresponding to the shape of the light emission surface 843 of the lens 840 when viewed from the outside. In some embodiments, however, the light emission surface 843 of the lens 840 may include a discontinuous boundary. In this case, a plurality of surfaces of the light emission surface 843 may be observed based on the discontinuous boundary.

Referring to FIG. 19, the focal line FL of the lens 840 may include a first focal line FL1 and a second focal line FL2. The first focal line FL1 may extend along a horizontal direction, and the second focal line FL2 may extend in an obliquely upward direction from the first focal line FL1. The first focal line FL1 and the second focal line FL2 may be provided on a focal boundary of the shield 830. The first focal line FL1 may be used to provide boundary lines BL1 and BL2, and the second focal line FL2 may be used to provide a slope line SL.

To provide the first focal line FL1 and the second focal line FL2, the lens 840 may be configured in a particular geometry. Hereinafter, the particular geometry of the lens will be described with reference to FIGS. 20 to 22.

Figure 20:
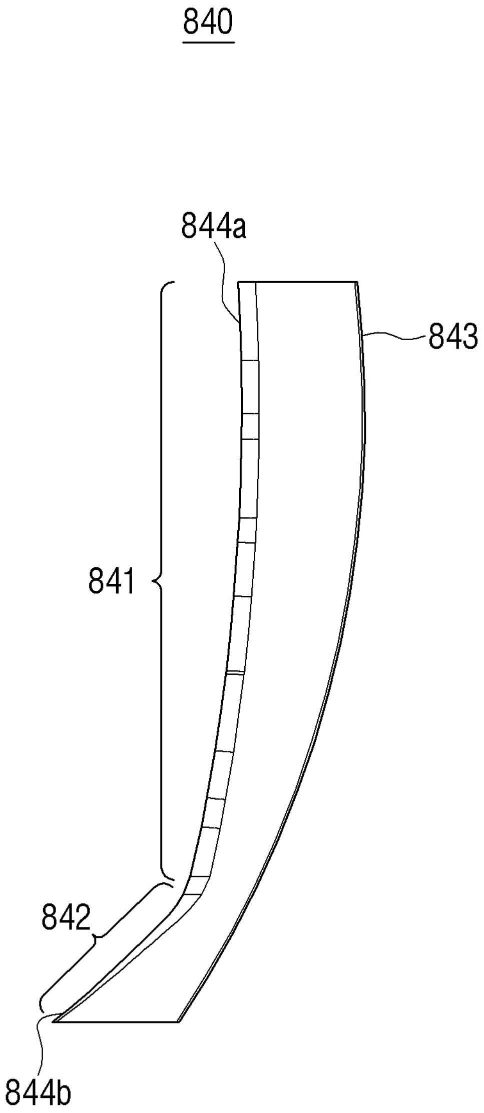
FIG. 20 is a plan view of the lens according to an embodiment of the present disclosure.
Figure 21:
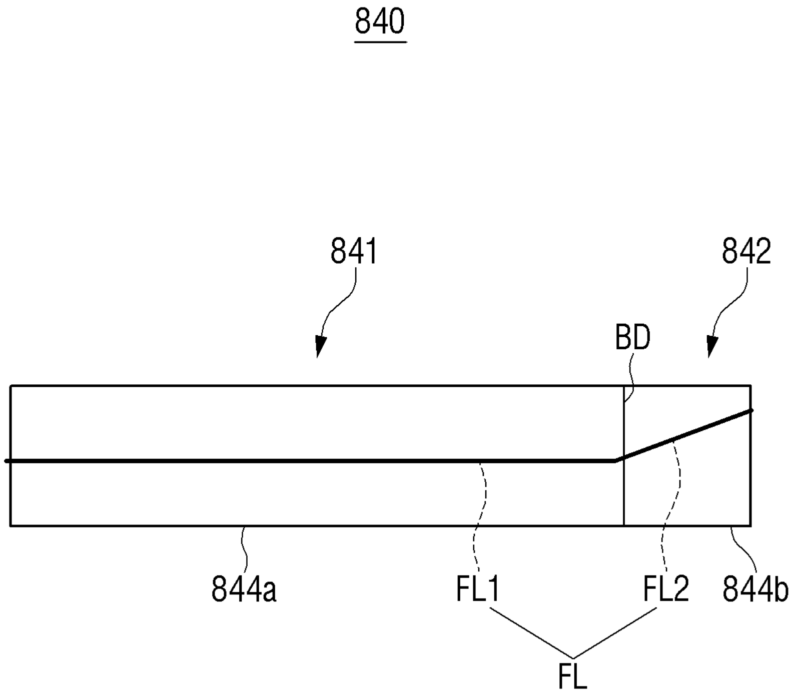
FIG. 21 is a rear view of the lens according to an embodiment of the present disclosure.
Figure 22:
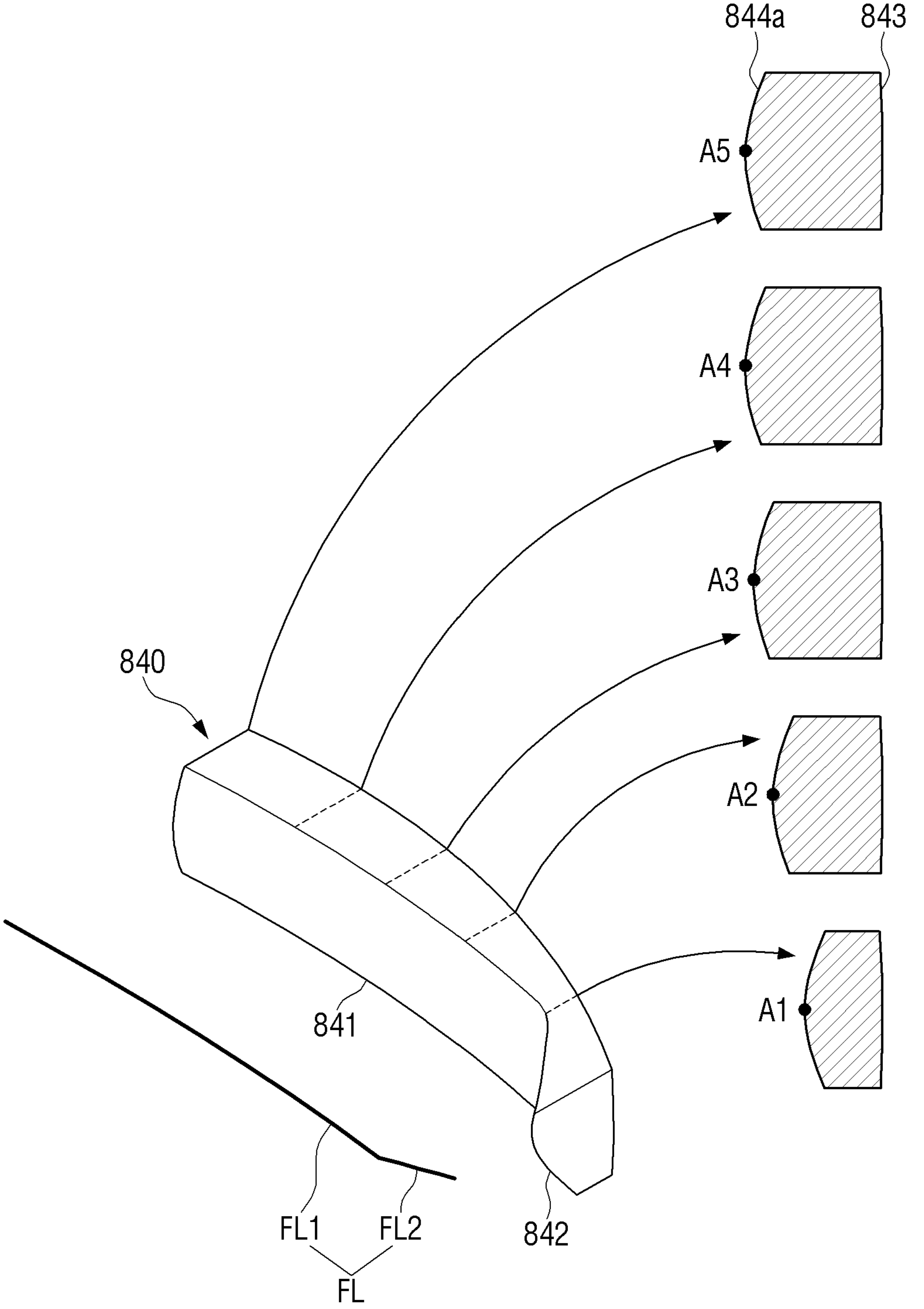
FIG. 22 is a view for depicting cross-sections of a first lens part according to an embodiment of the present disclosure.
Figure 23:
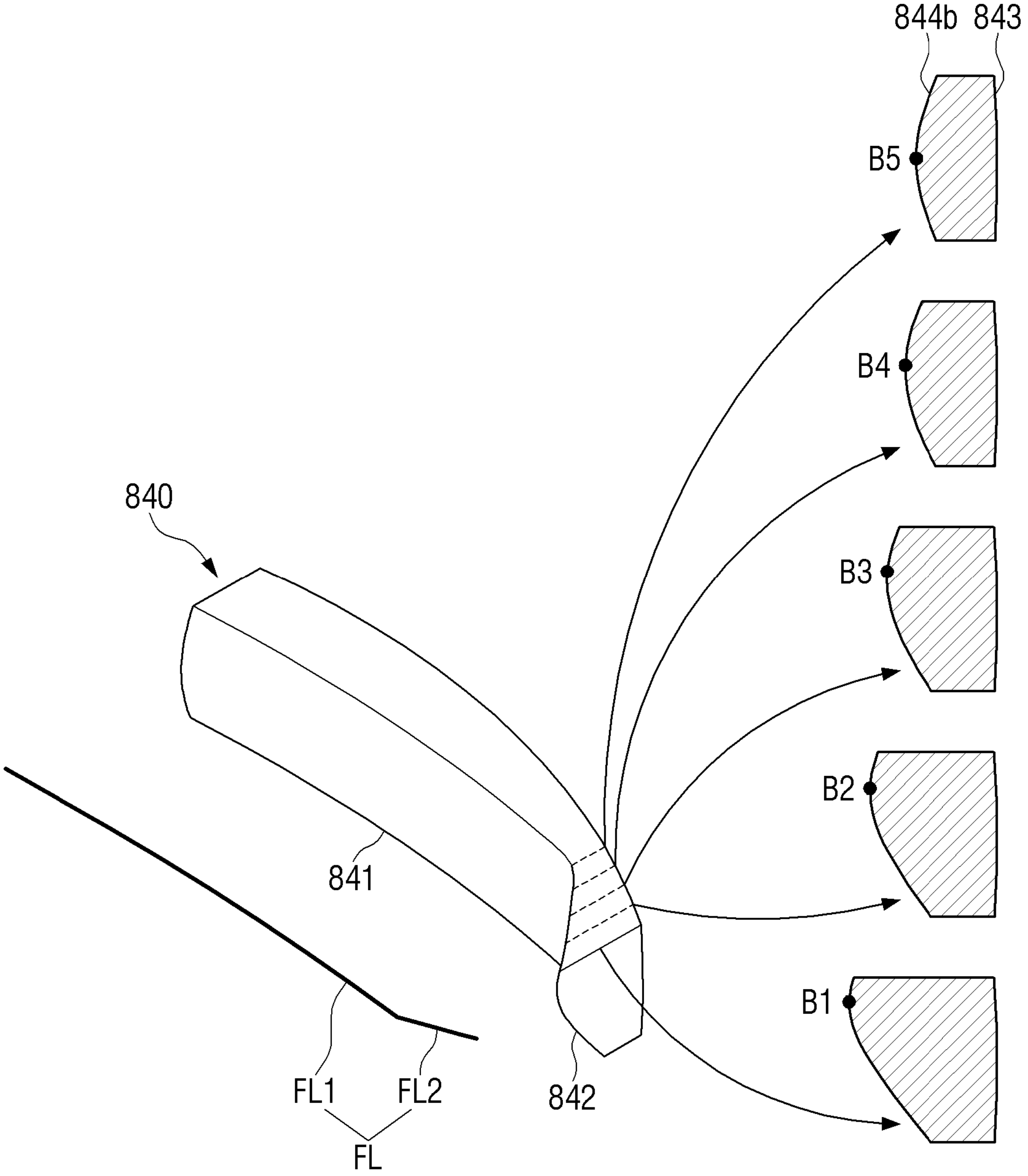
FIG. 23 is a view for depicting cross-sections of a second lens part according to an embodiment of the present disclosure.

FIG. 20 is a plan view of the lens, FIG. 21 is a rear view of the lens, FIG. 22 is a view for depicting cross-sections of a first lens part, and FIG. 23 is a view for depicting cross-sections of a second lens part.

Referring to FIGS. 20 and 21, the lens 840 may include a first lens part 841 and a second lens part 842. The first lens part 841 may provide the first focal line FL1, and the second lens part 842 may provide the second focal line FL2.

The lens 840 may include light incident surfaces 844*a* and 844*b* and a light emission surface 843. The light incident surfaces 844*a* and 844*b* may receive the light emitted from the reflector 820, and the light emission surface 843 may emit the light incident to the light incident surfaces 844*a* and 844*b*.

The light emission surface 843 may have a continuous curvature over the entire area. Thus, the light emission surface 843 may not include a discontinuous boundary over the entire area. In an embodiment of the present disclosure, the continuous curvature may mean that curvatures of adjacent areas are the same as or similar to one another and are not changed abruptly. In other words, the light emission surface 843 may be formed to be differentiable across the entire contour thereof.

In some embodiments, however, the light emission surface 843 of the lens 840 may include at least one section having a discontinuous curvature (e.g., a non-differentiable contour). Hereinafter, the light emission surface 843 of the lens 840 will mainly be described as having the continuous curvature over the entire area (e.g., differentiable contour).

The light incident surfaces 844*a* and 844*b* may include a first incident surface 844*a* and a second incident surface 844*b*. The first incident surface 844*a* may receive light for providing the first focal line FL1, and the second incident surface 844*b* may receive light for providing the second focal line FL2. The first incident surface 844*a* may include a surface through which the light is incident on the first lens part 841, and the second incident surface 844*b* may include a surface through which the light is incident on the second lens part 842.

The first incident surface 844*a* and the second incident surface 844*b* may be connected to each other. A boundary BD may be provided between the first incident surface 844*a* and the second incident surface 844*b*. At the boundary BD between the first incident surface 844*a* and the second incident surface 844*b*, a curvature of the first incident surface 844*a* and a curvature of the second incident surface 844*b* may be discontinuously provided or may be changed. At the boundary BD between the first incident surface 844*a* and the second incident surface 844*b*, curvatures of both sides may be discontinuously provided. Thus, as illustrated in FIG. 21, the first focal line FL1 and the second focal line FL2 may extend in different directions from their abutting points, respectively.

The first incident surface 844*a* and the second incident surface 844*b* may have continuous curvature on each area. According to some embodiments of the present disclosure, each of the first incident surface 844*a* and the second incident surface 844*b* may include at least one section having a discontinuous curvature.

As illustrated in FIG. 21, the first focal line FL1 may be disposed substantially parallel to the horizontal direction, and the second focal line FL2 may extend in an obliquely upward direction from an end of the first focal line FL1.

Referring to FIG. 22, heights (e.g., vertical positions) of vertexes (e.g., crest ridge) A1 to A5 of the first incident surface 844*a* with respect to the bottom of the lens 840 may be uniformly provided regardless of a distance to the second lens part 842. For example, the heights of any vertexes A1 to A5 of the first incident surface 844*a* may be constant over the entire longitudinal section of the first lens part 841 with respect to the bottom of the lens 840. Thus, as illustrated in FIG. 21, the first focal line FL1 may be provided in a linear shape that is substantially parallel to the longitudinal direction of the lens 840.

Referring to FIG. 23, however, heights (e.g., vertical positions) of vertexes (e.g., crest ridge) B1 to B5 of the second incident surface 844*b* with respect to the bottom of the lens 840 may increase as a distance from the first lens part 841 increases.

The heights (e.g., vertical positions) of the vertexes B1 to B5 of the second incident surface 844*b* over the entire longitudinal section of the second lens part 842 with respect to the bottom of the lens 840 may be different depending on the distance from the first lens part 841. In other words, the heights of vertexes B1 to B5 of the second incident surface 844*b* with respect to the bottom of the lens 840 may increase as the distance from the first lens part 841 increases. Referring to FIG. 23, the height of the vertex B1 on the second incident surface 844*b* that is farthest from the first lens part 841 may be greater than the height of the vertex B5 on the second incident surface 844*b* that is closest to the first lens part 841. Since the heights of the vertexes B1 to B5 of the second incident surface 844*b* with respect to the bottom of the lens 840 increase as the distance from the first lens part 841 increases, the second focal line FL2 may be provided in a linear shape that is inclined with respect to the longitudinal direction of the lens 840.

As a focal line FL by the lens 840 includes the first focal line FL1 and the second focal line FL2, which extend in different directions, the boundary lines BL1 and BL2 and the slope line SL of the first beam pattern LP may be provided more distinctly.

According to the lamp for the vehicle according to the embodiments of the present disclosure as described above, the plurality of lens parts having different refractive powers may be provided in a single lens, and thus, the concentrated light area and the diffused light area of the low beam pattern may be more clearly implemented.

Although the embodiment of the present disclosure is described with reference to the accompanying drawings, those with ordinary skill in the technical field to which the present disclosure pertains will understand that the present disclosure can be carried out in other forms without changing the technical idea or essential features. Therefore, the above-disclosed embodiments are to be considered illustrative and not restrictive.

What is claimed is:

1. A lamp for a vehicle, comprising:

a first beam pattern formation part configured to emit first light for a first beam pattern; and a lens configured to form the first beam pattern by transmitting the first light, wherein the first beam pattern formation part comprises:

a first light source that emits the first light; and a shield configured to block a portion of the first light that is emitted from the first light source toward the lens, and wherein the lens comprises:

a spread lens that concentrates incident light to a focal line having a linear shape; and a spot lens that concentrates incident light to a point, wherein the first beam pattern comprises:

a spread pattern; and a spot pattern, which is smaller than the spread pattern and overlaps the spread pattern, wherein the shield comprises:

a spot shield that blocks a portion of light to form the spot pattern; and a spread shield that blocks a portion of light to form the spread pattern, wherein the light that passes through the spread lens forms the spread pattern, and the light that passes through the spot lens forms the spot pattern, wherein the spot shield comprises:

a boundary shield that blocks a portion of the light to form an upper boundary line of the spot pattern; and a slope shield that blocks a portion of the light to form the upper boundary line and a slope line of the spot pattern, wherein the lamp further comprises a first vehicle lamp disposed at a left side of the vehicle and a second vehicle lamp disposed at a right side of the vehicle, wherein the first vehicle lamp comprises a first slope shield and a first boundary shield, and the second vehicle lamp comprises a second slope shield and a second boundary shield, when the first slope shield is disposed more inward to the vehicle's longitudinal centerline than the first boundary shield, the second slope shield is disposed more outward from the vehicle's longitudinal centerline than the second boundary shield, and when the first slope shield is disposed more outward from the vehicle's longitudinal centerline than the first boundary shield, the second slope shield is disposed more inward to the vehicle's longitudinal centerline than the second boundary shield.

2. The lamp of claim 1, wherein the spread lens has an elongated shape in one direction, and wherein the spot lens is disposed at each of both sides of the spread lens.

3. The lamp of claim 2, wherein the first beam pattern formation part comprises a plurality of first reflectors that reflect the first light emitted from the first light source toward the spot lens, and wherein the first light is reflected to each of the spot lenses respectively disposed at both sides of the spread lens by at least one first reflector among the plurality of reflectors.

4. The lamp of claim 3, wherein the slope shield is disposed to correspond to the spot lens, which is disposed at one side among the spot lenses respectively disposed at both sides of the spread lens.

5. The lamp of claim 1, wherein a light emission surface of the lens has a continuous curvature over an entire area or comprises at least one section having a discontinuous curvature.

6. The lamp of claim 1, further comprising a second beam pattern formation part configured to emit second light that forms a second beam pattern different from the first beam pattern, wherein the second beam pattern formation part comprises a second light source that emits the second light, wherein the first beam pattern formation part comprises a first reflector that reflects the first light emitted from the first light source, and wherein the second beam pattern formation part comprises a second reflector that reflects the second light emitted from the second light source.

7. The lamp of claim 6, wherein each of the first reflector and the second reflector is provided in plurality, wherein the plurality of first reflectors and second reflectors are disposed side by side along a longitudinal direction of the lens, and wherein the first reflectors and the second reflectors are alternately disposed.

8. A lamp for a vehicle, comprising:

a first beam pattern formation part configured to emit first light for a first beam pattern; and a lens configured to form the first beam pattern by transmitting the first light, wherein the first beam pattern formation part comprises:

a first light source that emits the first light; and a shield configured to block a portion of the first light that is emitted from the first light source toward the lens, and wherein the lens comprises:

a spread lens that concentrates incident light to a focal line having a linear shape; and a spot lens that concentrates incident light to a point, wherein the spread lens has an elongated shape in one direction, and the spot lens is disposed at each of both sides of the spread lens.

9. The lamp of claim 8, wherein the first beam pattern comprises:

a spread pattern; and a spot pattern, which is smaller than the spread pattern and overlaps the spread pattern, and wherein the shield comprises:

a spot shield that blocks a portion of light to form the spot pattern; and a spread shield that blocks a portion of light to form the spread pattern, wherein the light that passes through the spread lens forms the spread pattern, and the light that passes through the spot lens forms the spot pattern.

10. The lamp of claim 9, wherein the spot shield comprises:

a boundary shield that blocks a portion of the light to form an upper boundary line of the spot pattern; and a slope shield that blocks a portion of the light to form the upper boundary line and a slope line of the spot pattern.

11. The lamp of claim 8, wherein the first beam pattern formation part comprises a plurality of first reflectors that reflect the first light emitted from the first light source toward the spot lens, and wherein the first light is reflected to each of the spot lenses respectively disposed at both sides of the spread lens by at least one first reflector among the plurality of reflectors.

12. The lamp of claim 11, wherein the slope shield is disposed to correspond to the spot lens, which is disposed at one side among the spot lenses respectively disposed at both sides of the spread lens.

13. The lamp of claim 8, wherein a light emission surface of the lens has a continuous curvature over an entire area or comprises at least one section having a discontinuous curvature.

14. The lamp of claim 8, further comprising a second beam pattern formation part configured to emit second light that forms a second beam pattern different from the first beam pattern, wherein the second beam pattern formation part comprises a second light source that emits the second light, wherein the first beam pattern formation part comprises a first reflector that reflects the first light emitted from the first light source, and wherein the second beam pattern formation part comprises a second reflector that reflects the second light emitted from the second light source.

15. The lamp of claim 14, wherein each of the first reflector and the second reflector is provided in plurality, wherein the plurality of first reflectors and second reflectors are disposed side by side along a longitudinal direction of the lens, and wherein the first reflectors and the second reflectors are alternately disposed.

16. The lamp of claim 14, wherein the first reflector is disposed more proximate to the lens compared to the second reflector.

17. The lamp of claim 8, wherein a curvature of a light incident surface of the spot lens is greater than a curvature of a light incident surface of the spread lens.

* * * * *